United States Patent
Faccin et al.

(10) Patent No.: US 10,244,381 B2
(45) Date of Patent: Mar. 26, 2019

(54) SUPPORTING MULTIPLE CONCURRENT SERVICE CONTEXTS WITH A SINGLE CONNECTIVITY CONTEXT

(71) Applicant: QUALCOMM Incorporated, San Diego, CA (US)

(72) Inventors: Stefano Faccin, San Ysidro, CA (US); Gavin Bernard Horn, La Jolla, CA (US); John Wallace Nasielski, San Diego, CA (US); Lenaig Genevieve Chaponniere, La Jolla, CA (US); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/003,888

(22) Filed: Jun. 8, 2018

(65) Prior Publication Data
US 2018/0295499 A1    Oct. 11, 2018

Related U.S. Application Data

(63) Continuation of application No. 15/092,330, filed on Apr. 6, 2016, now Pat. No. 10,021,559.
(Continued)

(51) Int. Cl.
*H04W 8/18*    (2009.01)
*H04W 12/06*    (2009.01)
(Continued)

(52) U.S. Cl.
CPC .......... *H04W 8/18* (2013.01); *H04L 63/0815* (2013.01); *H04L 65/1066* (2013.01); *H04W 4/60* (2018.02);
(Continued)

(58) Field of Classification Search
CPC ......... H04W 8/18; H04W 4/60; H04W 75/15; H04W 12/06; H04W 76/12; H04W 80/02; H04L 63/0815; H04L 65/1066
See application file for complete search history.

(56) References Cited

U.S. PATENT DOCUMENTS

| | | | |
|---|---|---|---|
| 5,491,802 A | 2/1996 | Thompson et al. | |
| 6,172,990 B1 | 1/2001 | Deb et al. | |

(Continued)

FOREIGN PATENT DOCUMENTS

| | | |
|---|---|---|
| WO | WO-2004110083 A1 | 12/2004 |
| WO | WO-2009038522 A1 | 3/2009 |
| WO | WO-2011043772 A1 | 4/2011 |

OTHER PUBLICATIONS

International Search Report and Written Opinion—PCT/US2016/038430—ISA/EPO—dated May 16, 2017.

*Primary Examiner* — Duc C Ho
(74) *Attorney, Agent, or Firm* — Loza & Loza, LLP

(57) ABSTRACT

Methods and apparatus supporting multiple concurrent service contexts sharing a single connectivity context are disclosed. A device may initiate a radio link with a network node and establish a connectivity context with the network node over the radio link using a connectivity logical context of the device. The network node may receive, authenticate, and authorize context establishment requests. A first service context with a first service management entity may be established over the radio link using a first logical context of the device, where the first logical context is distinct from the connectivity logical context. Multiple service connections using multiple service contexts based on multiple logical contexts of the device may share the connectivity context and may be established over the radio link.

20 Claims, 16 Drawing Sheets

Related U.S. Application Data

(60) Provisional application No. 62/201,094, filed on Aug. 4, 2015.

(51) Int. Cl.
*H04W 76/15* (2018.01)
*H04W 4/60* (2018.01)
*H04L 29/06* (2006.01)
*H04W 76/12* (2018.01)
*H04W 80/02* (2009.01)

(52) U.S. Cl.
CPC ........... *H04W 12/06* (2013.01); *H04W 76/15* (2018.02); *H04W 76/12* (2018.02); *H04W 80/02* (2013.01)

(56) References Cited

U.S. PATENT DOCUMENTS

| | | |
|---|---|---|
| 6,996,105 B1 | 2/2006 | Wilson |
| 2007/0183434 A1 | 8/2007 | Pandey |
| 2012/0076121 A1* | 3/2012 | Choi .................... H04W 36/08 370/338 |
| 2012/0147834 A1 | 6/2012 | Zisimopoulos et al. |
| 2012/0214445 A1 | 8/2012 | Stojanovski et al. |
| 2012/0300750 A1* | 11/2012 | Chin ................. H04W 36/0022 370/331 |
| 2015/0127733 A1* | 5/2015 | Ding ....................... H04W 4/08 709/204 |
| 2015/0334615 A1* | 11/2015 | Zhang ................... H04W 36/04 370/331 |
| 2017/0041776 A1 | 2/2017 | Faccin et al. |
| 2018/0192234 A1* | 7/2018 | Mohamed ............... H04L 67/18 |

* cited by examiner

SUPPORTING MULTIPLE CONCURRENT SERVICE CONTEXTS WITH A SINGLE CONNECTIVITY CONTEXT

CROSS-REFERENCE TO RELATED APPLICATIONS

The present application for patent is a continuation application of U.S. patent application Ser. No. 15/092,330 entitled "Supporting Multiple Concurrent Service Contexts With A Single Connectivity Context" filed Apr. 6, 2016, which in turn claims priority to U.S. Provisional Application No. 62/201,094, entitled "Supporting Multiple Concurrent Connectivity And Service Contexts" filed Aug. 4, 2015, the entire disclosures of which are hereby expressly incorporated by reference.

FIELD

The present application is related to methods, systems, and devices that support operation of a single device, which maintains multiple subscriber credentials for multiple subscriptions and may operate on multiple concurrent service contexts with a single connectivity context in a single domain (e.g., a packet switched domain over a single radio link).

BACKGROUND

Several issues affect wireless systems today. Current wireless systems (e.g., 4G, LTE, LTE-A, WLAN, Wi-Fi) operate exclusively in the packet switched domain. Today's wireless systems support only a single subscription/single credential using a single connectivity context between a user device and a connectivity management portion of a network (e.g., a single non-access stratum (NAS) context between a user equipment (UE) and a mobility management entity (MME)). In the past, 3G systems supported a single subscription/single credential that covered one connection in each of the packet switched and circuit switched domains. The 3G systems supported an ability to register for the two domains in a single procedure. According to that procedure, an uplink dedicated control channel (UL DCCH) message was used to carry registrations for the packet switched and the circuit switched domain networks. A serving general packet radio service (GPRS) support node (SGSN) in the packet switched domain would update the mobile switching center (MSC) on the circuit switched domain. In this way, 3G systems allowed for communication in two distinct domains using one subscription. Even so, within each given domain there existed only a single connectivity context. In other words, a 3G system, under one subscription, would use one credential to provide a device with one connectivity context in each of the circuit switched and packet switched domains. The concept of registering in multiple domains is not a part of today's paradigm, where systems, like long term evolution (LTE), operate only in the packet switched domain.

From a security point of view, identifying security parameters for a context of a single device in a 3G system could be relatively uncomplicated. For example, in 3G the signal radio bearer 2 (SRB2) was secured with the security keys of the latest context that was created. This made it straightforward to know which security context to apply to the SRB2. There were no provisions for multiple security contexts for a single physical device in a single domain, at least because only one security context was needed.

User equipment (UE) (e.g., client device, mobile device) can include a subscriber identity module (SIM) card that includes identification information and a key unique to that SIM card. A UE making use of a subscription to a service provided by a network operator is able to establish a radio link with the network by virtue of the identification and key information stored on the SIM card. In other words, there is presently a tight connection (e.g., a one-to-one relationship) between the use of an access link (e.g., for user plane and Radio Resource Control (RRC) or Media Access Control (MAC) signaling connections in case of cellular) and the connectivity context (e.g., Evolved Packet System (EPS) Mobility Management (EMM)—and EPS Session Management (ESM)—in case of LTE). Furthermore, when a UE connects with a network, in the example of LTE, a mobility management context (e.g., Evolved Packet System (EPS) Mobility Management (EMM)) and a session management context (e.g., EPS Session Management (ESM)) are created in a mobility management entity (MME); both contexts are associated with the radio link. There is a one-to-one association between the pair of contexts and the radio link. Accordingly, it may be said that the pair of related contexts are tightly coupled to the radio link.

Presently, specific services may be delivered and controlled by dedicated functionality in a core network (CN). At present, for example, 3GPP is considering a model where for a set of a given type of device (e.g., machine-to-machine (M2M) devices), dedicated mobility management entities (MMEs) are provisioned in the network, and the MME selection in the eNB considers the type of device in selecting the MME. In other words, if certain MMEs are dedicated for M2M traffic, then each eNB will know to connect a device to one and only one MME that is dedicated to M2M traffic in connection with M2M device attachment to a network. It is not possible today, however, to concurrently connect one physical UE to multiple MMEs, let alone multiple dedicated MMEs.

Systems of the future may need to support dedicated non-access stratum (NAS) functionality, including support of specific service-dedicated pre-5G NAS solutions. This support may be useful for forward compatibility. For example, a future 5G core network (CN) designed to support dedicated devices (e.g., M2M devices) might also be designed to provide that support over new radio access technology (RAT) and legacy RAT.

It is not possible today to enable both an ability to provide dedicated network functionality for the provisioning of multiple services to a single device using a single subscriber credential, and also to support additional distinct subscriber credentials. Today's wireless devices and systems have not been designed to enable this ability. Devices today may be trapped in a paradigm of using only one SIM card per device. Therefore, if a user needs to access a different set of radio links, for example during travel, the paradigm of today may force the user to obtain a different device, or a different SIM card for the device already owned.

What is needed are methods, devices, and/or systems to break the paradigm of having to obtain a different devices/SIM cards for access to different radio links and/or to overcome some or all of the above-mentioned drawbacks of the prior art.

SUMMARY

In one exemplary aspect, a method, operational at a device may include initiating a radio link with a network node, establishing a connectivity context with a connectivity serving node over the radio link using a connectivity logical context of the device, and establishing a first service context with a first service management entity (SME) over the radio link using a first logical context of the device. In the exemplary aspect, the first logical context may be distinct from the connectivity logical context. In an aspect, the method may also include multiplexing signaling traffic associated with the connectivity context and one or more service connections for the device concurrently over the radio link.

In an exemplary implementation of a device, the device may include a network communication circuit for communicating over a wireless network and a processing circuit coupled to the network communication circuit. The processing circuit may be configured, for example, to initiate a radio link with a network node, to establish a connectivity context with a connectivity serving node over the radio link using a connectivity logical context of the device, and to establish a first service context with a first service management entity (SME) over the radio link using a first logical context of the device. In the exemplary implementation, the first logical context may be distinct from the connectivity logical context.

In another exemplary implementation of a device, the device may include means for communicating over a wireless network. The device may further include means for initiating a radio link over the wireless network with a network node, means for establishing a connectivity context with a connectivity serving node over the radio link using a connectivity logical context of the device, and means for establishing a first service context with a first service management entity (SME) over the radio link using a first logical context of the device. In the second exemplary implementation, the first logical context may be distinct from the connectivity logical context. The device may further include means for multiplexing signaling traffic associated with the connectivity context and one or more service connections for the device concurrently over the radio link. In another exemplary implementation, the device may further include means for transmitting and/or receiving signaling traffic via one or more of the connectivity context and one or more service connections over the radio link.

In one aspect, a non-transitory machine-readable storage medium having instructions stored thereon may be described. In the aspect, the instructions may be executed by a processing circuit. In the aspect, the instructions, which when executed by the processing circuit may cause the processing circuit to initiate a radio link with a network node, establish a connectivity context with a connectivity serving node over the radio link using a connectivity logical context of a device, and establish a first service context with a first service management entity (SME) over the radio link using a first logical context of the device. According to the aspect, the first logical context may be distinct from the connectivity logical context.

In another exemplary aspect, a method, operational at a connectivity serving node, may include receiving a context establishment request over a radio link from a device for a connectivity context based on a connectivity logical context of the device, authenticating and authorizing the context establishment request, receiving a first service connection request from the device for a first service context based on a first logical context that is instantiated in the device, and establishing a first service connection for the device over the radio link using the first service context. According to the exemplary aspect, the first service context may be distinct from the connectivity context.

In an exemplary implementation, a connectivity serving node may include a network communication circuit for communicating with one or more wireless networks and devices and a processing circuit coupled to the network communication circuit. In the implementation, the processing circuit may be configured to receive a context establishment request over a radio link from a device for a connectivity context based on a connectivity logical context of the device, authenticate and authorize the context establishment request, receive a first service connection request from the device for a first service context based on a first logical context that is instantiated in the device, and establish a first service connection for the device over the radio link using the first service context. In the exemplary implementation, the first service context may be distinct from the connectivity context.

In one aspect, an example of a connectivity serving node may include means for receiving a context establishment request over a radio link from a device for a connectivity context based on a connectivity logical context of the device, means for authenticating and authorizing the context establishment request, means for receiving a first service connection request from the device for a first service context based on a first logical context that is instantiated in the device, and means for establishing a first service connection for the device over the radio link using the first service context. In the example of the connectivity serving node, the first service context may be distinct from the connectivity context. In one implementation, the means for establishing the first service connection may further include means for selecting or reselecting a first service management entity (SME) based on an identity of the first logical context, and means for sending a first service connection request to the first SME. In another implementation, the connectivity node may further include means for sending signaling traffic between the device and the first SME through the first service connection over the radio link, wherein the first service connection is one of a plurality of distinct service connections associated with the connectivity context.

In another aspect, a non-transitory machine-readable storage medium having instructions stored thereon may be described. The instructions may be executed by a processing circuit. According to the aspect, the instructions, which when executed by the processing circuit, may cause the processing circuit to receive a context establishment request over a radio link from a device for a connectivity context based on a connectivity logical context of the device, authenticate and authorize the context establishment request, receive a first service connection request from the device for a first service context based on a first logical context that is instantiated in the device, and establish a first service connection for the device over the radio link using the first service context. The first service context may be distinct from the connectivity context.

According to one aspect, a method, operational at a service management entity (SME), may be described. The method may include receiving, at the SME, a service connection request for a first logical context of a device, the first logical context related to an existing connectivity context, from the device, authenticating and authorizing the service connection request at the SME, and establishing, using the first logical context of the device, a first service context if the service connection request is successfully authenticated and authorized. According to the aspect, the first service context may be distinct from the existing connectivity context.

In an implementation, an exemplary service management entity (SME) may include a network communication circuit for communicating over a network and a processing circuit coupled to the network communication circuit. In the implementation, the processing circuit may be configured to receive a service connection request for a first logical context of a device, the first logical context related to an existing connectivity context, from the device, authenticate and authorize the service connection request, and establish, using a first logical context of the device, a first service context if the service connection request is successfully authenticated and authorized. According to the implementation, the first service context may be distinct from the existing connectivity context.

In one exemplary aspect, a method, operational at a device may include initiating a radio link between the device and a network node, establishing a connectivity context with a connectivity serving node, and establishing a plurality of service contexts with a service management entity. According to one aspect, the connectivity context and the plurality of service contexts may all be established over the radio link between the device and the network node. In one aspect, a connectivity logical context of the device may be used to establish the connectivity context with the connectivity serving node. The connectivity context may be based on a first set of credentials associated with the connectivity logical context of the device. In such an aspect, a plurality of logical contexts of the device may be used to establish the plurality of service contexts, respectively, with the service management entity. Each of the plurality of service contexts may be based a corresponding set of credentials associated with a corresponding one of the plurality of logical contexts of the device. In one example, the connectivity context may be shared by the plurality of service contexts. And in still another example, the connectivity context may include mobility management and signaling security for the device. In another exemplary aspect, the plurality of service contexts may each switch between at least a connected mode and a disconnected mode, and each of the plurality of service contexts may be maintained in the device regardless of whether a given service context of the plurality of service contexts switches between the connected mode and the disconnected mode. According to one example, when there is no connection between the device and the network node with respect to at least one of the plurality of service contexts, the at least one of the plurality of service contexts does not have to be reestablished when a connection is reestablished between the device and the network node with respect to the at least one of the plurality of service contexts. The connection may be reestablished between the device and the network node when the at least one of the plurality of service contexts switches from a disconnected mode to a connected mode.

In another exemplary aspect, in a device having a network communication circuit for communicating over a wireless network and a processing circuit coupled to the network communication circuit, the processing circuit may initiate a radio link between the device and a network node, establish a connectivity context with a connectivity serving node, and establish a plurality of service contexts with a service management entity. According to one aspect, the connectivity context and the plurality of service contexts may all be established over the radio link between the device and the network node. In one aspect, the processing circuit may also establish the connectivity context with the connectivity serving node using a connectivity logical context of the device. The connectivity context may be based on a first set of credentials associated with the connectivity logical context of the device. The processing circuit may further establish the plurality of service contexts with the service management entity using a respective plurality of logical contexts of the device. Each of the plurality of service contexts may be based a corresponding set of credentials associated with a corresponding one of the plurality of logical contexts of the device. In one example, the processing circuit may also share the connectivity context with the plurality of service contexts. In one example, the connectivity context may include mobility management and signaling security for the device. In some examples, the processing circuit may also maintain each of the plurality of service contexts regardless of whether a given service context of the plurality of service contexts switches between a connected mode and a disconnected mode. In one example, when there is no connection between the device and the network node with respect to at least one of the plurality of service contexts, the at least one of the plurality of service contexts does not have to be reestablished when a connection is reestablished between the device and the network node with respect to the at least one of the plurality of service contexts. The connection may be reestablished between the device and the network node when the at least one of the plurality of service contexts switches from a disconnected mode to a connected mode.

In another exemplary aspect, a non-transitory machine-readable storage medium may have instructions stored thereon which when executed by a processing circuit may cause the processing circuit to initiate a radio link between the device and a network node, establish a connectivity context with a connectivity serving node, and establish a plurality of service contexts with a service management entity. In one aspect, the connectivity context and the plurality of service contexts may all be established over the radio link between the device and the network node. In one aspect, the non-transitory machine-readable storage medium may further have instructions stored thereon which when executed by the processing circuit may cause the processing circuit to establish the connectivity context with the connectivity serving node using a connectivity logical context of the device. The connectivity context is based on a first set of credentials associated with the connectivity logical context of the device. The non-transitory machine-readable storage medium may further have instructions stored thereon which when executed by the processing circuit may cause the processing circuit to establish the plurality of service contexts with the service management entity using a respective plurality of logical contexts of the device. Each of the plurality of service contexts may be based a corresponding set of credentials associated with a corresponding one of the plurality of logical contexts of the device. The non-transitory machine-readable storage medium may further have instructions stored thereon which when executed by the processing circuit may cause the processing circuit to share the connectivity context with the plurality of service contexts. The connectivity context may include mobility management and signaling security for the device. The non-transitory machine-readable storage medium may still further have instructions stored thereon which when executed by the processing circuit may cause the processing circuit to maintain each of the plurality of service contexts regardless of whether a given service context of the plurality of service contexts switches between a connected mode and a disconnected mode. In one example, when there is no connection between the device and the network node with respect to at least one of the plurality of service contexts, the at least one of the plurality of service contexts does not have to be reestablished when a connection is reestablished between the device and the network node with respect to the at least one of the plurality of service contexts. The connection may be reestablished between the device and the network node when the at least one of the plurality of service contexts switches from a disconnected mode to a connected mode.

DETAILED DESCRIPTION

Figure 1:
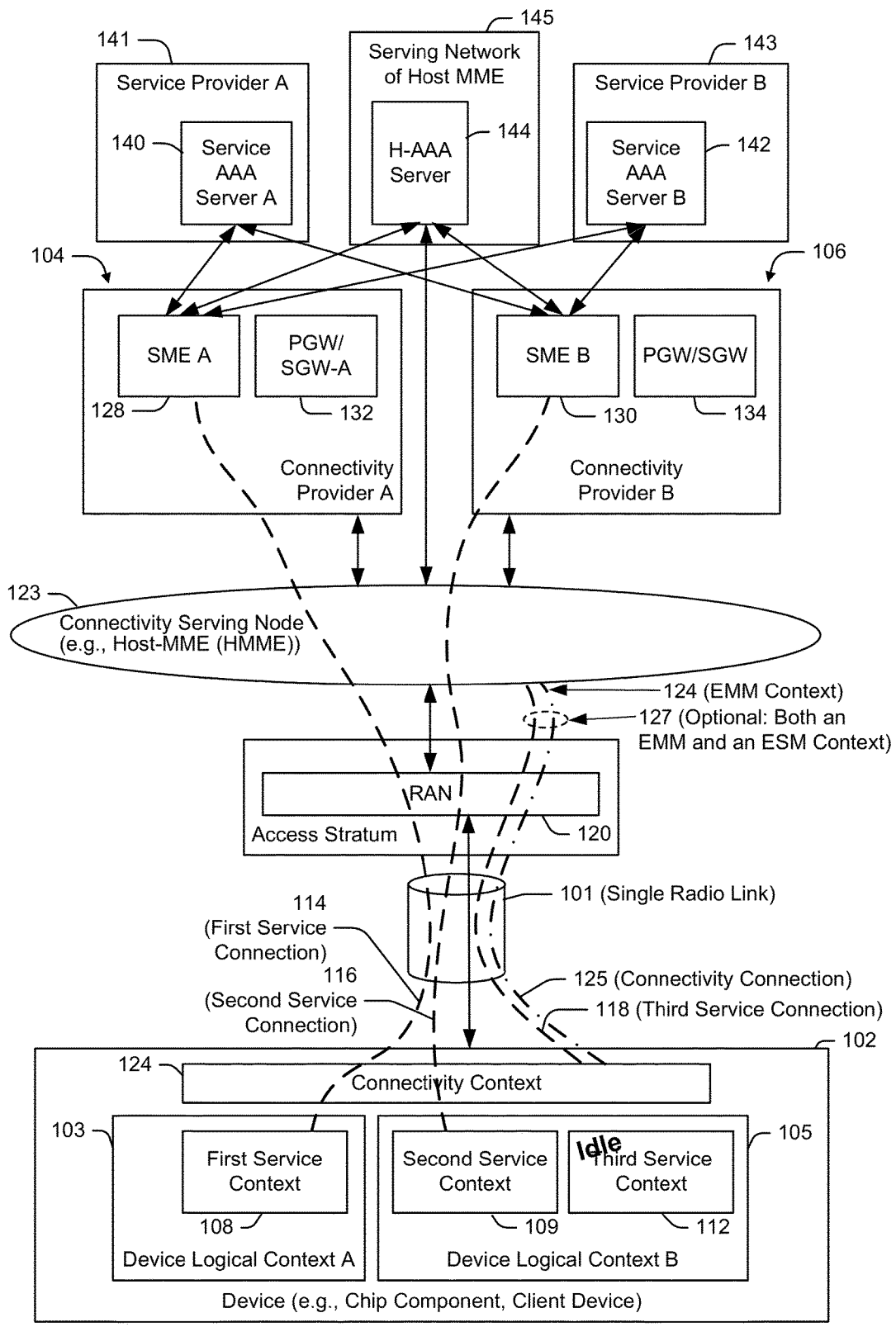
FIG. 1 illustrates a single radio link between a device (e.g., chip component, client device) and a network node, such as a radio access network (RAN).

In the following description, specific details are given to provide a thorough understanding of the aspects described herein. However, it will be understood by one of ordinary skill in the art that the aspects may be practiced without these specific details. For example, circuits may be shown in block diagrams in order to avoid obscuring aspects in unnecessary detail. In other instances, well-known circuits, structures, and techniques may not be shown in detail in order not to obscure the aspects more fully described herein.

The term "exemplary" may be used herein to mean "serving as an example, instance, or illustration." Any implementation or aspect described herein as "exemplary" is not necessarily to be construed as preferred or advantageous over other implementations or aspects.

The term "aspect" does not require that all aspects include the discussed aspect, or any discussed feature, advantage, and/or mode of operation.

The term "device" may be used herein to refer to a chip component and/or a client device, such as a mobile device, mobile phone, mobile communication devices, mobile computing device, digital tablet, smart phone, user equipment, user device, terminal among other devices.

The term "obtain" may be used herein to mean derive locally or receive from a non-local source or entity. The term "obtain" contemplates obtaining partially and/or obtaining completely.

For ease of discussion and illustration, the terminology used herein may appear to address LTE; however, the aspects described herein are not intended to be limited to LTE. The aspects described herein are applicable to LTE and beyond LTE, for example 5G. The aspects described herein may also be applicable to networks developed prior to LTE, such as 4G or Wi-Fi. Accordingly, the aspects described herein may be employed in systems implemented before standardization of 5G. For example, aspects described herein may be introduced as an addendum to the standards of 4G, LTE, and/or LTE-A networks. Accordingly, references made to terms that may be associated with 3G, 4G, and/or LTE-A are made only for illustrative purposes and are not intended to limit the scope of any aspect presented herein.

Overview

A first aspect provides for sharing a single connectivity context with multiple concurrent service contexts to establish a single radio link that supports multiple concurrent service connections that use the multiple concurrent service contexts. The multiple concurrent service contexts may be multiple distinct service contexts. In one example, a connectivity context comprises an EMM context. Optionally, a connectivity context may include an EMM context and an ESM context. For instance, a radio resource control (RRC) or media access control (MAC) link may be established between a device (e.g., chip component, client device) and a radio access network (RAN) based on, for example, a shared connectivity context (e.g., a single connectivity context shared with one or more service contexts). In one example, the RAN may be a cellular RAN or a radio network composed of Wi-Fi access points, or a combination of cellular and Wi-Fi radio. In another example, the RAN may be composed of one or mode radio access nodes operating in licensed or unlicensed spectrum and controlled by a radio resource control (RRC) or media access control (MAC) mechanism. In various examples, an RRC may include cellular RRC, cellular radio resource management (RRM), or media access control (MAC), or any other signaling mechanism to control access to radio resources over one or more links, including establishment of radio resources for transport of higher layer signaling and user data. The device may use multiple distinct service contexts to establish concurrent service connections over the single radio link. In one example, a service context comprises an ESM context. In this manner, a single connectivity context can be used for lower level radio link connectivity while two or more service contexts may be used to establish service connections over the single radio link.

A second aspect provides for a connectivity serving node, referred to herein as a host mobile mobility entity (HMME), to receive a connectivity context request, authenticate the request, and establish a connectivity context with a device in response to the request. In an example, the connectivity serving node (e.g., HMME) may perform non-access stratum (NAS) EPS Session Management (ESM) and EPS Mobility Management (EMM) over a control plane with the device to control mobility and/or security for the device. Accordingly, the connectivity context (e.g., EMM context) may serve to establish a single radio link that can be shared concurrently with one or more service contexts of a device. In one example, authenticating the connectivity context request can include skipping the authentication when the connectivity serving node (e.g., HMME) recognizes the request is for an emergency service or any other service in which authentication can be skipped. Authenticating may be based on, for example, one or more of service type indication (e.g., a service identifier), device type indication (e.g., a device type), the selected PLMN (public land mobile network) indication, and one or more identifiers of the radio access point points the device is connected to (including a eNB identifier, a cell identifier, a Wi-Fi AP identifier, etc.), an Access Point Name provided by the device, and a Service Access Point Identifier provided by the device. In an aspect, the selected PLMN indication, the radio access point identifier, access point identifiers (including a eNB identifier, a cell identifier, a Wi-Fi AP identifier, etc.), the Access Point Name, and the Service Access Point Identifier may individually, collectively, or in any combination be considered examples of a network identifier. In one example, if authentication is skipped, the connectivity serving node (e.g., HMME) can allow the device to establish only service connections specific to one or more of a service type indication, a device type indication, and a selected PLMN indication provided by the device in the request, according to a user profile (obtained via a network AAA), and/or according to a local connectivity serving node (e.g., HMME) configuration.

A third aspect provides for a service management entity (SME), operated, for example, by a service provider and distinct from the connectivity serving node (e.g., HMME), which is configured to authenticate and authorize service contexts for a device with a service authorization, authentication, and accounting (service AAA) server. The SME may ascertain whether a service connection between the device and a service provider should be setup based on, for example, credentials associated with a service context.

Single Connectivity Context Supporting Multiple Concurrent Service Contexts

FIG. 1 illustrates a single radio link 101 between a device 102 (e.g., chip component, client device) and a network node, such as a radio access network (RAN) 120. The single radio link 101 may serve to couple the device 102 to two or more networks while supporting concurrent multiple service connections 114, 116, 118 associated with multiple service contexts 108, 109, 112 (e.g., ESM contexts). In greater detail, FIG. 1 illustrates that a single radio link 101 (e.g., one and only one RRC link, one and only one RRC connection) between a device 102 and a radio access network (RAN) 120 (e.g., eNB) may serve to couple the device 102 to two or more service providers (e.g., service provider A 141, service provider B 143) via two or more provisioning functionalities (e.g., connectivity provider A 104, connectivity provider B 106) while supporting multiple service connections such as a first service connection 114, a second service connection 116, and a third service connection 118 associated with the multiple service contexts 108, 109, 112 (e.g., first service context 108, second service context 109, third service context 112).

In one example, a connectivity context 124, established by the device 102, may serve to establish the single radio link 101 that can be shared by multiple concurrent service contexts 108, 109, 112. Accordingly, the connectivity context 124 may be referred to as a shared connectivity context. The connectivity context 124 may be a mobility management context. The connectivity context 124 (e.g., EMM context) may be used with a network serving node referred to herein as a connectivity serving node 123 or a host mobility management entity (HMME). The connectivity serving node 123 (e.g., HMME) may provide security, signaling for data bearer management and data connection management, paging, and mobility. The use of the connectivity context 124, having a connectivity connection 125, may facilitate concurrent use by the multiple service contexts 108, 109, 112, having corresponding multiple service connections 114, 116, 118, over the single radio link 101. As used herein, connectivity connection 125 means a signaling connection or a coupling for the transport of signaling (in contrast to a transport of data) (e.g., an EMM NAS signaling connection, an optional EMM and ESM NAS signaling connection).

For example, if the device 102 has three types of subscriptions (e.g., that may use multiple service contexts 108, 109, 112), use of a connectivity context 124 (e.g., a single connectivity context that may be shared by one or more service contexts, a single connectivity context that may be shared by a plurality of service contexts) may enable an ability to provide concurrent multiple service connections 114, 116, 118 (one for each subscription and/or service context of the multiple service contexts 108, 109, and 112) over the single radio link 101 (e.g., using a single radio bearer), from the device 102. As illustrated in FIG. 1, any one or more of the service connections 114, 116, 118 may be idle or active at any given time.

A connectivity serving node 123 may be implemented close to the RAN 120 and may serve to manage the establishment of the connectivity context 124 (e.g., the EMM context) to establish the single radio link 101 by, for example, authenticating the connectivity context 124.

The connectivity serving node 123 may serve to authenticate the connectivity context 124 obtained from a device 102. The connectivity serving node 123 may perform non-access stratum (NAS) EPS Mobility Management (EMM) over a control plane with the device 102 to control, for example, mobility and/or security for the device 102. The connectivity serving node 123 may authenticate the connectivity context 124 of the device 102 with a home authorization, authentication, and accounting (H-AAA) server 144 of the serving network 145 of the connectivity serving node 123 to ascertain whether the connectivity context 124 should be established. Authentication may be based on, for example, credentials and a subscription associated with the connectivity context 124 stored in the H-AAA server 144. In an aspect, credentials can be used to establish a context such as the connectivity context 124. Accordingly, credentials can be used to authenticate the context. Accordingly, the connectivity context 124 may serve to establish the single radio link 101 that can be shared by one or more service contexts 108, 109, 112 of the device 102.

In an optional implementation 127, the connectivity serving node 123 may also perform non-access stratum (NAS) EPS Session Management (ESM) over a control plane with the device 102 to support service provisioning for the third service connection 118. In the optional implementation 127, both an EMM context and an ESM context may be established.

The following architectural considerations may be contemplated for aspects related to the connectivity serving node 123 as described herein. In one example, the connectivity serving node 123 may provide a secure tunnel between the device 102 and a core network. For example, a connectivity context (e.g., EMM context) with a connectivity serving node (e.g., HMME) can have a security context that may protect all signaling. In one example, the connectivity serving node 123 may act as a virtual MME that aggregates knowledge about the existence of multiple ESM contexts. In one example, the connectivity serving node 123 may act as an aggregator also from a point of view of mobility management, thus SMEs need not necessarily be aware of the device 102 mobility status. In one example, the connectivity serving node 123 may act as an anchor for radio mobility. In one example, a traditional non-access stratum (NAS) model may be modified to enable separate EMM and ESM contexts. That is, in one example, a connectivity context 124 (e.g. an EMM context) with a connectivity serving node 123 can be established without an ESM context.

In an optional implementation 127, both an EMM and an ESM context with the connectivity serving node 123 can be established. For example, the connectivity serving node 123 may have an EMM context. In addition to the EMM context, the connectivity serving node 123 may create an ESM context (e.g., if the connectivity serving node 123 provides PDN connectivity service to a device 102).

In one example, a first set of credentials used to authenticate for EMM security (e.g., connectivity credentials) may be different from a second set of credentials used to authenticate for ESM security (e.g., service credentials). In another example, the NAS model enables the establishment of an EMM context and one or more ESM contexts concurrently using the same set of credentials (e.g., the first set of credentials is the same as, or is equal to, the second set of credentials). For example, when a connectivity serving node 123 creates an ESM context, the ESM context may be established based on, for example, the same credential used to establish the EMM context.

In aspects described herein, once the connectivity context 124 is established, the device 102 may establish one or more ESM contexts corresponding to different sets of credentials with different network entities. Implementing the connectivity context 124 (e.g., the single connectivity context) with multiple ESM contexts may facilitate service differentiation through service provisioning by differentiated connection management entities in one or more networks. The differentiated connection management entities may be exemplified with dedicated mobility management entities (MMEs). Differentiated connection management entities (e.g., dedicated MMEs) may be referred to herein as service management entities (SMEs).

In the example of FIG. 1, the RAN 120 may be coupled to a plurality of connectivity providers (e.g., connectivity provider A 104 and connectivity provider B 106). The connectivity providers may operate in different networks. Connectivity provider A 104 may have a service management entity referred to herein as SME A 128 as well as one or more Packet Data Network Gateways (PGW) and one or more Serving Gateways (SGW) referred to herein collectively as PGW/SGW A 132. Connectivity provider B 106 may have a service management entity referred to herein as SME B 130 as well as one or more Packet Data Network Gateways (PGW) and one or more Serving Gateways (SGW) referred to herein collectively as PGW/SGW B 134.

SME A 128 may maintain a first service context 108 for a first service connection 114. SME B 130 may maintain a second service context 109 for a second service connection 116. The first service context 108 and the second service context 109 may be established using the credentials and the subscription associated with the device logical context A 103 and device logical context B 105 by the device 102. SME A 128 may authenticate the first service context 108 (e.g., a first ESM context) with service authorization, authentication, and accounting server A (service AAA server A) 140 to ascertain whether the first service connection 114 should be setup based on, for example, the credentials associated with device logical context A 103 and provided by service provider A 141. SME B 130 may authenticate the second service context 109 (e.g., a second ESM context) with service authorization, authentication, and accounting server B (service AAA server B) 142 to ascertain whether the second service connection 116 should be setup based on, for example, the credentials associated with device logical context B 105 and provided by service provider B 143.

In the exemplary illustration of FIG. 1, the device 102 may support a first service context 108, a second service context 109, and a third service context 112. However, it is contemplated that any number of service contexts may be supported by the device 102.

In FIG. 1, the first service context 108, second service context 109, and third service context 112 may be supported between the device 102 and connectivity provider A 104 and/or connectivity provider B 106. Each of the first service context 108, second service context 109, and third service context 112 may correspond to one or more sets of credentials. In some aspects, a service that is associated with one set of credentials may be allowed to establish multiple service contexts. In aspects described herein, a set of credentials may include a set of information that enables identification of the device 102 (or user/subscriber of the device 102) to a service provider or connectivity provider. A set of credentials may include, among other things, security keys used for authentication.

In one example, the first service connection 114, second service connection 116, and third service connection 118 may provide for multiple concurrent service contexts (e.g., first service context 108, second service context 109, and third service context 112) that may be multiplexed over a single Layer 2 connection of a communication protocol stack (e.g., LTE Layer 2, RRC layer, WI-FI, etc.). Multiple concurrent service contexts (e.g., first service context 108, second service context 109, and third service context 112) may be distinguished based on, for example, specific/distinct identities used by the device 102 for each service context.

The device 102 may obtain a set of credentials that provide secure access to establish connectivity (e.g., access) with the connectivity serving node 123 that provides the connectivity context 124 (e.g., an EMM context) for the device 102 with the network and enables mobility management. Such credentials can be, for instance, out-of-the-box credentials, operator credentials, credentials provided by an original equipment manufacturer (OEM) and installed in the device 102 during manufacturing by an entity manufacturing the device 102. The use of OEM credentials may enable an OEM to provide the credentials and host the authentication for such credentials, thus enabling the device 102 to support different service providers where, for example, service provider credentials are used to provide service context only (e.g., ESM context only). With the use of OEM credentials for establishment of a connectivity context 124 (e.g., an EMM context), it may be possible to establish the connectivity context 124 to provide signaling, mobility management, security, etc. without charging to establish the connectivity context 124 because no data traffic is generated in relation to the connectivity context 124.

Service credentials (e.g., service-related credentials) may be used to establish one or more service contexts (e.g., ESM contexts) with a Service Management Entity (e.g., SME A 128, SME B 130). In various configurations, a service management entity (SME) may be physically separate from a connectivity serving node (e.g., HMME) (e.g., as in FIG. 2), the Service Management Entity may be logically co-located or hosted at the connectivity serving node (e.g., as in FIG. 3), or a combination thereof where some service management entities may be logically co-located/hosted by the connectivity serving node and other service management entities may be physically separate from the connectivity serving node (e.g., as in FIG. 4).

In one example, all the service contexts (e.g., ESM contexts) established for a device 102 may share the same requirements in terms of a connectivity model (e.g., an EMM model). According to such an example, when a device 102, upon connectivity context 124 (e.g., EMM context) establishment, indicates a specific set of device types or service features (e.g. device type such as Machine-to-Machine (M2M), multimedia, etc.) in the connectivity model (e.g., the EMM model), then the connectivity serving node 123 may perform a specific treatment (e.g., mobility management, security, etc.) for the specific set of device types or service features indicated by the device 102 in the connectivity model (e.g., the EMM model). Such specific treatment may apply to all service contexts (e.g., ESM contexts) established for the device 102 in connection with the connectivity context 124 (e.g., EMM context) established for the device 102.

If a device 102 seeks to establish a second service context (e.g., a second ESM context) that makes use of a different treatment at the connectivity level (e.g., the EMM level), the device 102 may re-establish the connectivity context 124 (and in some aspects may drop the other active service contexts) and upon establishment of a new connectivity context (e.g., new EMM context), indicate a different set of device types or service features.

Exemplary Network Operating Environments and/or Configurations

Figure 2:
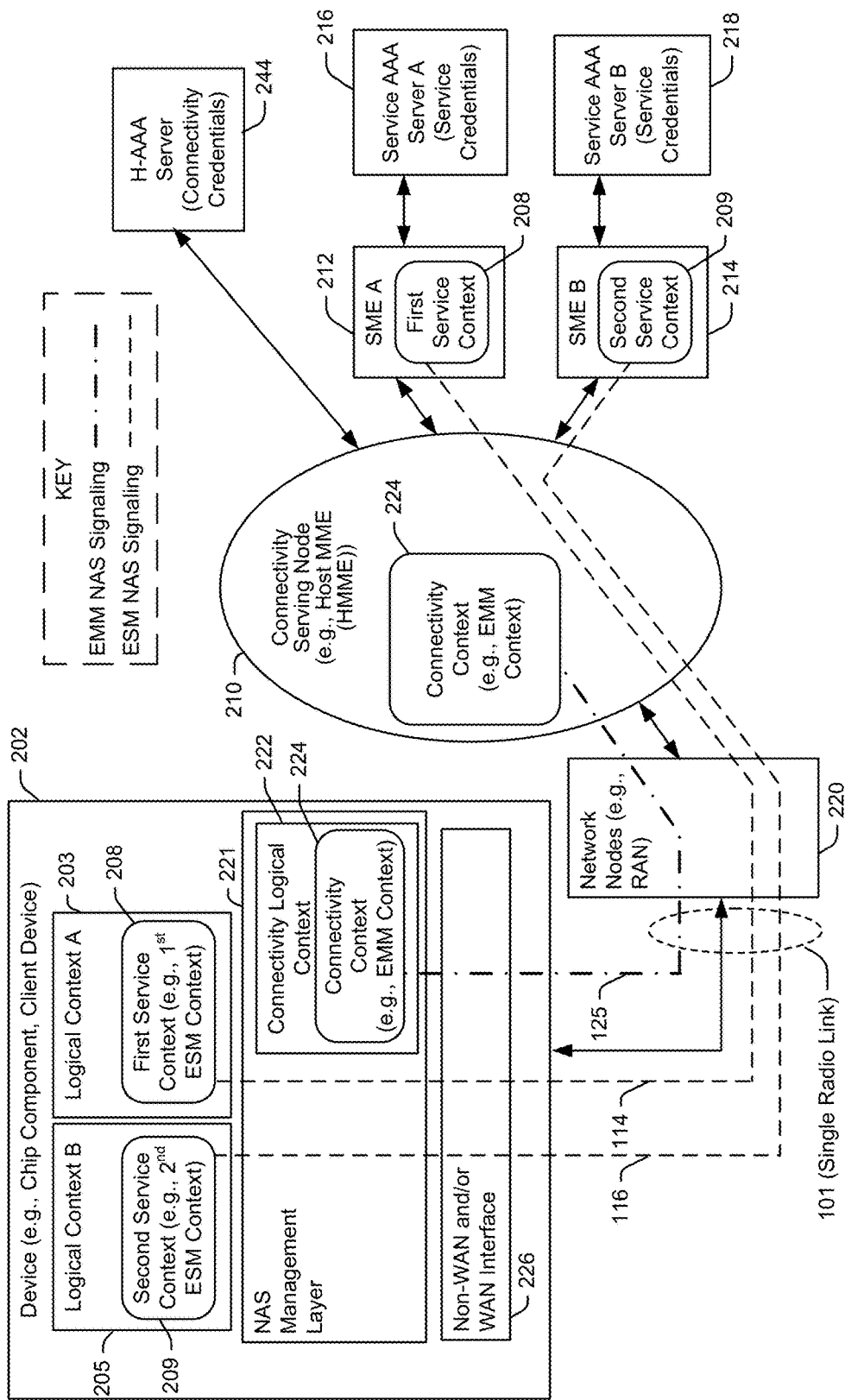
FIG. 2 illustrates a first exemplary network environment including a connectivity serving node (e.g., a host mobility management entity (HMME)) and service management entities (SMEs) that are physically separated from the connectivity serving node.
Figure 3:
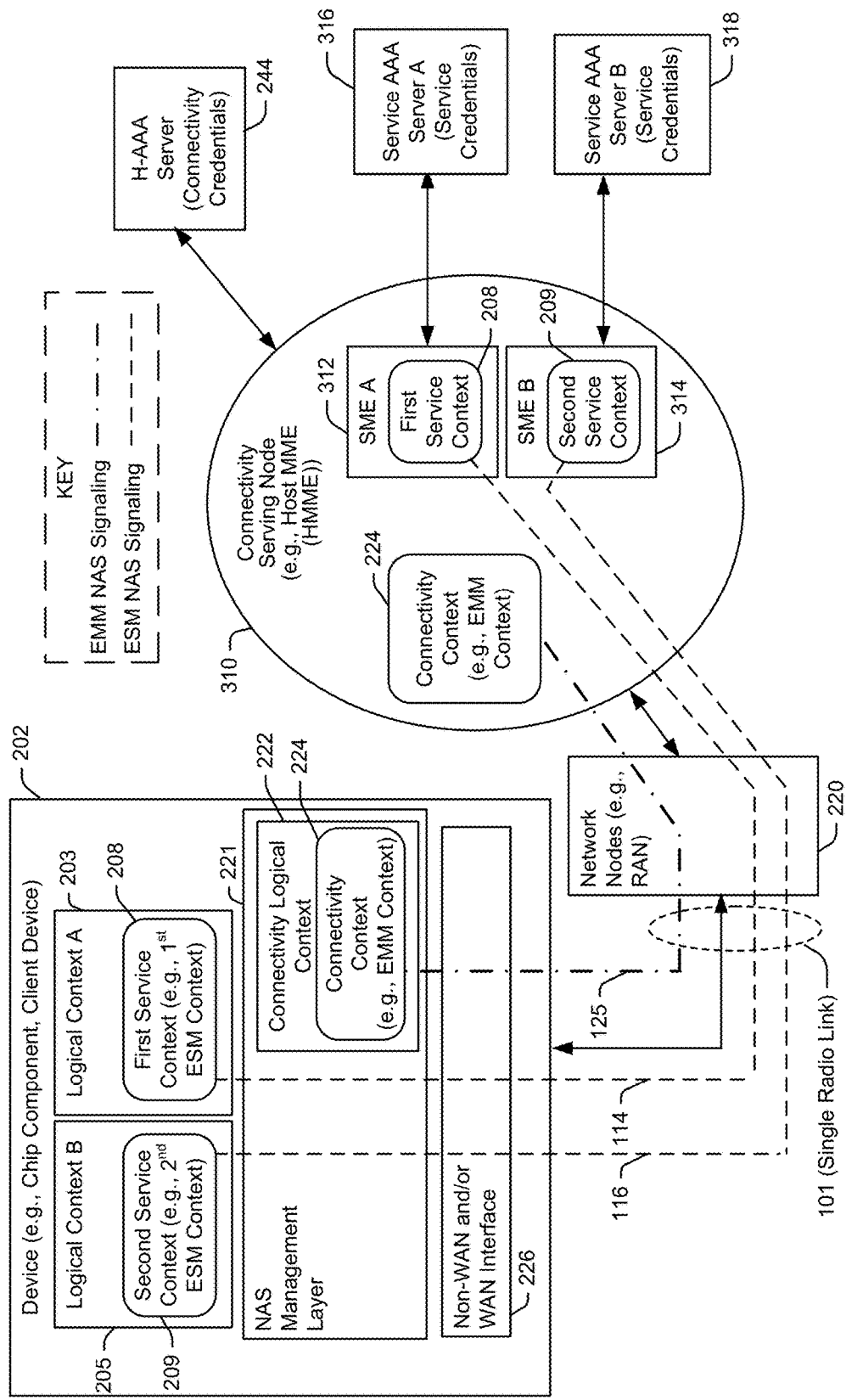
FIG. 3 illustrates a second exemplary network environment including a connectivity serving node and co-located/hosted service management entity (SME) logical nodes.
Figure 4:
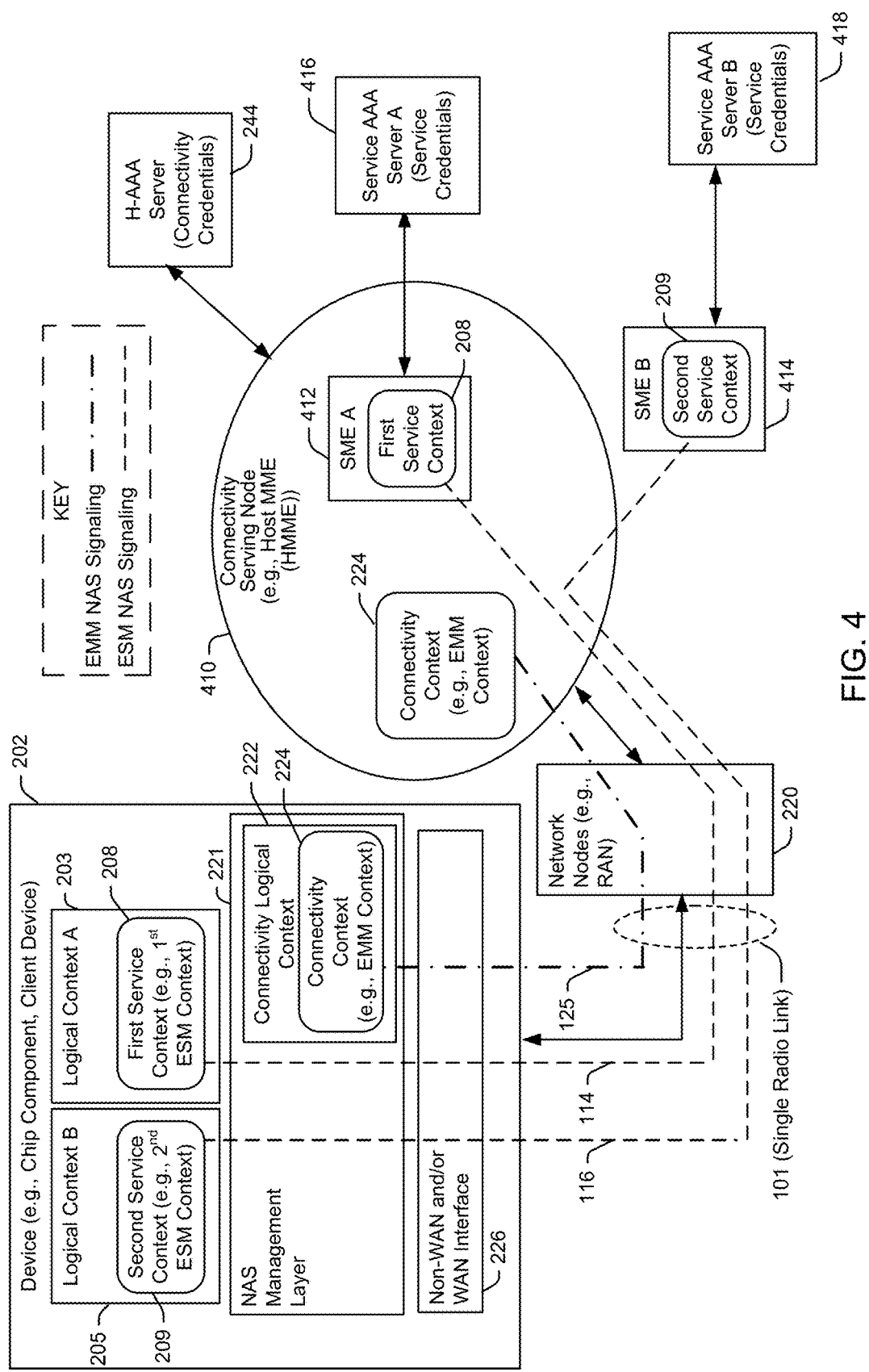
FIG. 4 illustrates a third exemplary network environment including a connectivity serving node and both a co-located/hosted SME logical node and a separate SME physical node.

FIGS. 2, 3, and 4 illustrate various exemplary network configurations having various arrangements of a connectivity serving node (e.g., an HMME) and one or more SMEs.

FIGS. 2, 3, and 4 illustrate that, in accordance with the exemplary network configurations, a device 202 and the connectivity serving node 210, 310, 410 may multiplex signaling traffic associated with a connectivity context that is shared by one or more service connections (or alternatively, shared by a plurality of service connections) for the device concurrently over a single radio link 101. In an aspect, the device 202 can transmit signaling traffic via one or more of the connectivity context and one or more service connections 114, 116 sharing the connectivity context over the single radio link 101. In an aspect, signaling traffic can be received at the device from the connectivity serving node 210, 310, 410 via one or more of the connectivity context and one or more service connections 114, 116 sharing the connectivity context over the single radio link.

FIG. 2 illustrates a first exemplary network environment including a connectivity serving node (e.g., a host mobility management entity (HMME)) and service management entities (SMEs) that are physically separated from the connectivity serving node. A connectivity context 224, established by the device 202, is depicted. The connectivity context 224 may serve to establish the single radio link 101 that can be shared by multiple concurrent service contexts 208, 209. Accordingly, the connectivity context 224 may be referred to as a shared connectivity context. The connectivity context 224 may be a mobility management context. The first exemplary network environment further include a connectivity serving node 210 (e.g., a host mobility management entity (HMME)) and service management entities (SMEs) that are physically separated from the connectivity serving node 210. The SMEs may be used for service context management. The separate SMEs may be exemplified by and referred to as SME A 212 and SME B 214. In an aspect, SME A 212 and SME B 214 may be described as differentiated connection management entities (e.g., dedicated MMEs).

In some implementations, the connectivity serving node 210 may obtain, store, implement, and/or exercise some or all of the mobility management knowledge and functionality of a network. In some implementations, the connectivity serving node 210 may obtain and/or store some or all of the system topology knowledge (e.g., for handoff, paging, etc.) of the network.

In the example of FIG. 2, the device 202 (e.g., chip component, client device) may communicate with one or more network nodes 220 (e.g., a RAN, an eNB of a RAN, an AP) that may be coupled to the connectivity serving node 210. The device 202 may include and/or support a plurality of logical contexts such as logical context A 203 and logical context B 205. Each logical context of the device 202 may be associated with and may support distinct services and service contexts.

Logical contexts such as logical context A 203 and/or logical context B 205 may be downloaded as a client to the device 202 by a service provider and/or a content provider. Each of the logical context A 203 and/or the logical context B 205 may have a mapping to a set of credentials (e.g., service credentials). The credentials may be stored in a service AAA server such as service AAA server A 216 and/or service AAA server B 218.

The connectivity serving node 210 may support a plurality of distinct SMEs such as SME A 212 and SME B 214. Each of SME A 212 and SME B 214 may support distinct services and service contexts. For example, SME A 212 may support a service context identified as first service context 208 and SME B 214 may support a different service context identified as second service context 209. SME A 212 and SME B 214 may perform service context management and service authorization. For example, SME A 212 and SME B 214 may authenticate the device 202 to a particular service AAA server such as service AAA server A 216 and/or service AAA server B 218.

In one aspect, a service context (e.g. first service context 208, second service context 209) may be maintained in the device 202 regardless of a current mode of the connectivity context 224 (e.g., a connectivity context that may be shared by one or more service contexts) of the device 202. For example, a service context (e.g. first service context 208, second service context 209) associated with a device 202 having a connectivity context 224 in an idle mode may be maintained (i.e., the service context does not have to be reestablished if the device 202 establishes a connection (e.g., switches to active mode)).

In one aspect, a service context (e.g. first service context 208, second service context 209) may have three modes. A first mode may be an "active" mode, where device 202 is connected and there is data traffic for the service. A second mode may be a "dormant" mode, where the device 202 is connected but there is no data traffic for the service but the service context is maintained (i.e., the service context does not have to be reestablished if the data traffic starts). A third mode may be an "idle" mode, where device 202 is idle (e.g., no RAN context), so there is no data traffic for the service but the service context is maintained (i.e., the service context does not have to be reestablished if the device 202 establishes a connection (e.g., switches to active mode).

In one example, logical context A 203 may operate under a first service connection 114 implementing the first service context 208 and logical context B 205 may operate under a second service connection 116 implementing the second service context 209. Accordingly, in the examples, SME A 212 may authenticate the device 202 with service AAA server A 216 to ascertain whether the first service connection 114 should be setup based on, for example, the credentials and the subscription associated with the device 202. In one example, upon successful authentication, a first service context 208 (e.g., first ESM context) may be established based on, for example, credentials associated with logical context A 203 of the device 202. The service AAA server A 216 may store the service credentials of the logical context A 203 of the device 202.

SME B 214 may authenticate the device 202 with service AAA server B 418 to ascertain whether the second service connection 116 should be setup based on, for example, the credentials and the subscription associated with the device 202. In one example, upon successful authentication, a second service context 209 (e.g., second ESM context) may be established based on, for example, credentials associated with logical context B 205 of the device 202. The service AAA server B 218 may store the service credentials of the logical context B 205 of the device 202.

The device 202 may include a NAS management layer 221. The NAS management layer 221 may, for example, maintain a mapping of services and/or traffic to contexts for applications, services, and/or access point names (APNs), in addition to existing mappings. The NAS management layer 221 may include a logical context for device 202 connectivity (e.g., access). As used herein, the exemplary logical context for device 202 connectivity (e.g., access) may be referred to as the connectivity logical context 222. The connectivity logical context 222 may, for example, provide for establishment and management of a connectivity context 224 (e.g., an EMM context) based on, for example, certain connectivity credentials. The connectivity logical context 222 may optionally provide for establishment and management of a service context (e.g., an ESM context) based on, for example, certain service credentials.

In an aspect, the connectivity logical context 222 may implement a connectivity context 224 (e.g., an EMM context). Accordingly, in the example, the connectivity serving node 210 may authenticate the device 202 with a home AAA server (H-AAA server) 244 to ascertain whether the connectivity context 224 should be setup based on, for example, the credentials and the subscription associated with the device 202. The H-AAA server 244 may store the connectivity credentials of the connectivity logical context 222 of the device 202.

The association between the logical contexts of the device 202 (e.g., logical context A 203, logical context B 205) and the NAS management layer 221 may, for example, provide for signaling for context establishment (e.g., service context establishment), transport of service signaling such as service context signaling (e.g., ESM signaling) (e.g., NAS), and/or mapping of a GUTI to a logical context (e.g., logical context A 203, logical context B 205) (e.g., mapping the GUTI of the device to the GUTSI and/or SCSI of the logical context). The association between the logical contexts of the device 202 may be based, for example, on an application program interface (API) or a service access point (SAP) for establishment and management of a service context (e.g., an ESM context) with a core network.

Also illustrated in FIG. 2 is a layer representative of a non-wide area network (non-WAN) interface and/or a wide area network (WAN) interface 226. In an aspect, a service connection (e.g., the first service connection 114, the second service connection 116) may interact with a WAN interface (e.g., a cellular network interface) and/or a non-WAN interface (e.g., a Wi-Fi interface). In more general terms, a service connection is able to interact with one or more interfaces. For example, the first service connection 114 and the second service connection 116 may both use a WAN interface, may both use a non-WAN interface, or one may use the WAN interface while the other uses the non-WAN interface.

FIG. 3 illustrates a second exemplary network environment including a connectivity serving node 310 (e.g., an HMME) and co-located/hosted service management entity (SME) logical nodes. The SME logical nodes may be used for service context management. The SME logical nodes may be exemplified by and referred to as SME A 312 and SME B 314. In an aspect, SME A 312 and SME B 314 may be described as differentiated connection management entities (e.g., dedicated MMEs).

In some implementations, the connectivity serving node 310 may obtain, store, implement, and/or exercise some or all of the mobility management knowledge and functionality of a network. In some implementations, the connectivity serving node 310 may obtain and/or store some or all of the system topology knowledge (e.g., for handoff, paging, etc.) of the network.

In an aspect, one or more distinct SME logical nodes such as SME A 312 and SME B 314 may be integrated with or implemented by the connectivity serving node 310. The connectivity serving node 310 may host SME logical nodes on behalf of one or more service providers and/or content providers. Each of the SME A 312 and the SME B 314 may support distinct services and service contexts. For example, SME A 312 may support a service context identified as a first service context 208 (e.g., first ESM context) and SME B 314 may support a different service context identified as a second service context 209 (e.g., second ESM context). SME A 312 and SME B 314 may perform service context authorization. In implementations where the connectivity serving node 310 implements SME logical nodes, the connectivity serving node 310 may perform service context management (e.g., QoS, bearer status, per-access point name (APN) congestion, etc.).

In the example, SME A 312 may maintain a first service context 208 for a first service connection 114. SME B 314 may maintain a second service context 209 for a second service connection 116. The first service context 208 and the second service context 209 may be established by the device 202 (e.g., chip component, client device) using the credential and the subscription associated with logical contexts of the device 202 such as logical context A 203 and logical context B 205 of the device 202, respectively.

For example, SME A 312 may authenticate the device 202 with service AAA server A 316 to ascertain whether the first service connection 114 should be setup based on, for example, the credentials and the subscription associated with the device 202. In one example, upon successful authentication, the first service context 208 (e.g., first ESM context) may be established based on, for example, credentials associated with logical context A 203 of the device 202. The service AAA server A 316 may store the service credentials of the logical context A 203 of the device 202.

SME B 314 may authenticate the device 202 with service AAA server B 318 to ascertain whether the second service connection 116 should be setup based on, for example, the credentials and the subscription associated with the device 202. In one example, upon successful authentication, the second service context 209 (e.g., second ESM context) may be established based on, for example, credentials associated with logical context B 205 of the device 202. The service AAA server B 318 may store the service credentials of the logical context A 203 of the device 202.

In FIG. 3, reference items with reference numerals identical to those described in previous figures have the same or similar purposes and perform in the same or similar ways as described previously. Accordingly, for conciseness, their description will not be repeated.

FIG. 4 illustrates a third exemplary network environment including a connectivity serving node 410 (e.g., an HMME) and both a co-located/hosted SME logical node and a separate SME physical node. The SMEs may be used for service context management. The separate SMEs may be exemplified by and referred to as SME A 412 and SME B 414. In an aspect, SME A 412 and SME B 414 may be described as differentiated connection management entities (e.g., dedicated MMEs).

In some implementations, the connectivity serving node 410 may obtain, store, implement, and/or exercise some or all of the mobility management knowledge and functionality of a network. In some implementations, the connectivity serving node 410 may obtain and/or store some or all of the system topology knowledge (e.g., for handoff, paging, etc.) of the network. In the exemplary network environment of FIG. 4, according to an aspect, service context management may be integrated into the connectivity serving node 410 in view of the SME A 412 logical node, while the separate SME B 414 physical node is also coupled to the connectivity serving node 410. The connectivity serving node 410 may host the SME A 412 logical node on behalf of one or more service/content providers. Each of the SME A 412 and the SME B 414 may support distinct services and service contexts. For example, the SME A 412 may support a service context identified as a first service context 208 (e.g., first ESM context) and the separate SME B 414 may support a different service context identified as a second service context 209 (e.g., second ESM context). The SME A 412 logical node and the SME B 414 physical node may both perform service context authorization. The connectivity serving node 410 may perform service context management (e.g., QoS, bearer status, per-APN congestion, etc.) in connection with the first service context 208 associated with the SME A 412 logical node. The separate SME B 414 physical node may perform service context authorization and service context management in connection with the second service context 209.

In the example of FIG. 4, the device 202 (e.g., chip component, client device) may communicate with one or more network nodes 220 (e.g., a RAN, an eNB of a RAN, an AP) coupled to the connectivity serving node 410. The device 202 may include and/or support a plurality of logical contexts such as logical context A 203 and logical context B 205. Each logical context of the device 202 may be associated with and may support distinct services and service contexts.

In the example, the SME A 412 may maintain the first service context 208 for a first service connection 114. The separate SME B 414 may maintain a second service context 209 for a second service connection 116. The first service context 208 and the second service context 209 may be established by the device 202 (e.g., chip component, client device) using the credentials and the subscription associated with logical contexts of the device 202 such as logical context A 203 and logical context B 205 of the device 202, respectively.

In an example, SME A 412 may authenticate the device 202 with service AAA server A 416 to ascertain whether the first service connection 114 should be setup based on, for example, the credentials and the subscription associated with the device 202. In one example, upon successful authentication, a first service context 208 (e.g., first ESM context) may be established based on, for example, credentials associated with logical context A 203 of the device 202. The service AAA server A 416 may store the service credentials of the logical context A 203 of the device 202.

The separate SME B 414 may authenticate the device 202 with service AAA server B 418 to ascertain whether the second service connection 116 should be setup based on, for example, the credentials and the subscription associated with the device 202. In one example, upon successful authentication, the second service context 209 (e.g., second ESM context) may be established based on, for example, credentials associated with logical context B 205 of the device 202. The service AAA server B 418 may store the service credentials of the logical context B 205 of the device 202.

In FIG. 4, reference items with reference numerals identical to those described in previous figures have the same or similar purposes and perform in the same or similar ways as described previously. Accordingly, for conciseness their description will not be repeated.

Figure 5:
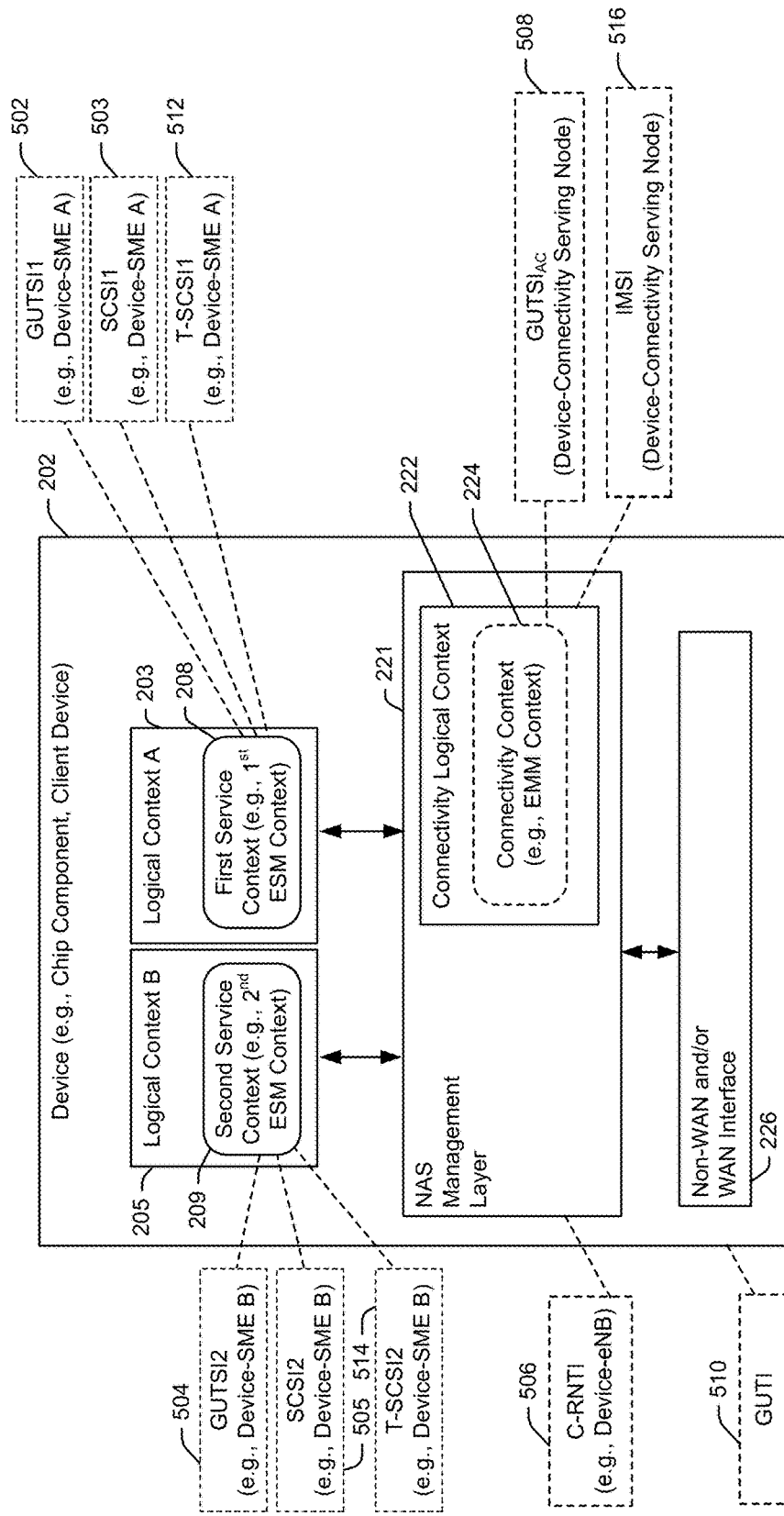
FIG. 5 illustrates an example of credential information that may be used at a device for a connectivity context, a first service context, and a second service context in an exemplary network as described herein.
Figure 6:
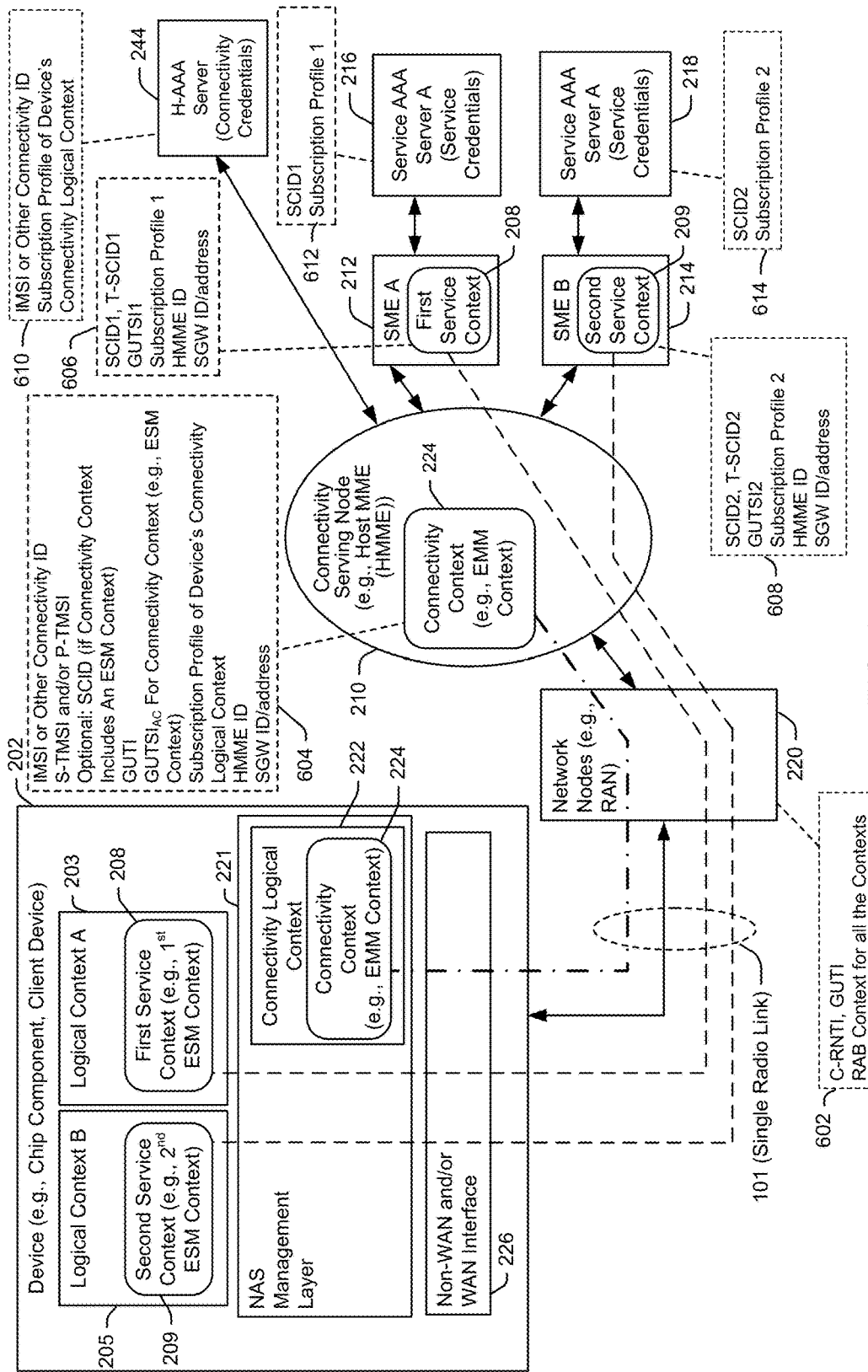
FIG. 6 illustrates a first example of credential information that may be used for a connectivity context, a first service context, and a second service context in the exemplary network of FIG. 2.
Figure 7:
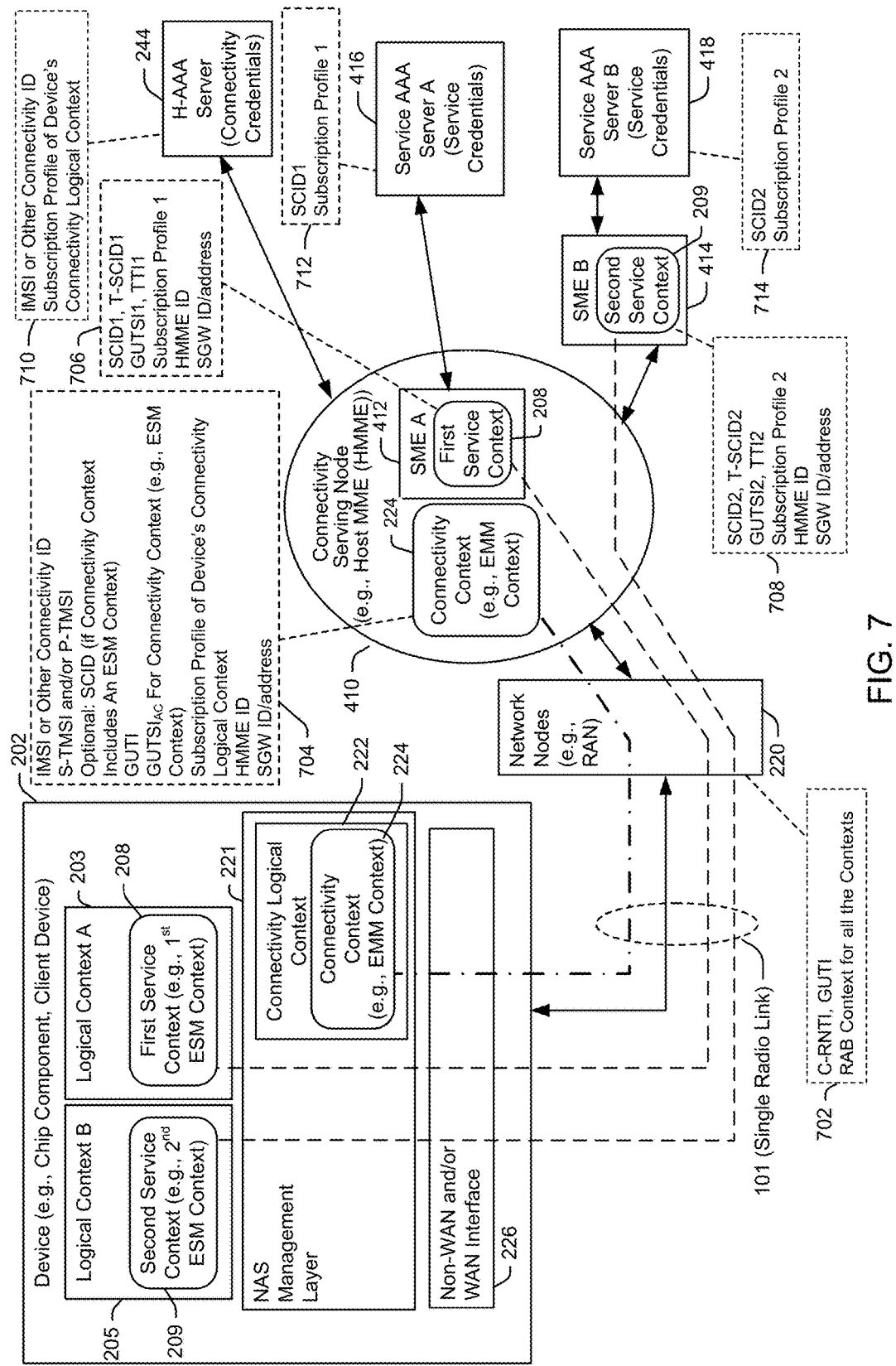
FIG. 7 illustrates a second example of credential information that may be used for a connectivity context, a first service context, and a second service context in the exemplary network of FIG. 4.

FIG. 5, FIG. 6, and FIG. 7, and illustrate examples of credential information (e.g., subscription information, security information, etc.) and will now be described.

FIG. 5 illustrates an example of credential information that may be used at a device 202 (e.g., chip component, client device) for a connectivity context 224 (e.g., an EMM context), a first service context 208, and a second service context 209 (e.g., ESM contexts) in an exemplary network as described herein.

FIG. 6 illustrates a first example of credential information that may be used for a connectivity context 224 (e.g., an EMM context), a first service context 208, and a second service context 209 (e.g., ESM contexts) in the exemplary network of FIG. 2.

FIG. 7 illustrates a second example of credential information that may be used for a connectivity context 224 (e.g., an EMM context), a first service context 208, and a second service context 209 (e.g., ESM contexts) in the exemplary network of FIG. 4.

In FIG. 5, discrete identifiers are depicted in boxes with broken line borders. In FIG. 6 and FIG. 7, groupings of identifiers are depicted in boxes with broken line borders. Identifiers include a Globally Unique Temporary Identity (GUTI), a Subscriber Session Identity (SCSI), a Temporary SCSI (T-SCSI), a Globally Unique Temporary Session Identity (GUTSI), Globally Unique Temporary Session Identity for Access (GUTSIAC), a Temporary Transport Identifier (TTI), an International Mobile Subscriber Identity (IMSI), an SAE-Temporary Mobile Subscriber Identity (S-TMSI), a Packet Domain Temporary Mobile Subscriber Identity (P-TMSI), a Cell Radio Network Temporary Identifier (C-RNTI), a Service Context Identifier (SCID), and a Temporary-Service Context Identifier (T-SCID). A description of each identifier follows below.

The device 202 may map (e.g., in the connectivity context 224) the device 202 GUTI to the GUTSI of each service context active in the device 202 (e.g. first service context 208, second service context 209)).

The GUTI 510 may unambiguously identify the device 202 in a way that does not reveal the device 202 permanent identity in an evolved packet system (EPS). The GUTI 510 may identify a connectivity serving node (e.g., an MME and/or HMME) and a network. The GUTI 510 may be used by the network and the device to establish the identity of the device. The connectivity serving node (e.g., an MME and/or HMME) may assign the GUTI to the device to identify the device during message exchange between the device and the EPC.

The SCSI (e.g., SCSI1 503, SCSI2 505) may be a permanent identity that a logical context of a device (e.g., logical context A 203, logical context B 205), which is instantiated in the device 202 (e.g., instantiated in the physical device), provides to an SME for authentication (similar to an IMSI in a device-MME authentication). The SCSI may identify a device 202 subscription and associated credentials. The SCSI may be used by an SME to identify which AAA server (e.g., service AAA server A 216, service AAA server B 218) to access to retrieve the device 202 subscription profile and authenticate the device 202.

The T-SCSI (e.g., T-SCSI1 512, T-SCSI2 514) may be a temporary identifier that may be allocated to identify the device 202 in subsequent signaling between the device 202 and an SME such as SME A 212, 312, 412, and/or SME B 214, 314, 414. The T-SCSI may be allocated at any suitable time. If an SME provides the T-SCSI to the device 202, the device 202 may use the T-SCSI in further signaling between the device 202 and the SME.

In an aspect, the GUTSI (e.g., GUTSI1 502, GUTSI2 504) may be allocated by an SME such as SME A 212, 312, 412 and/or SME B 214, 314, 414 to the device 202 upon successful authentication. The GUTSI may be used by the device 202 in signaling exchanged between the device 202 and the SME. In one example, the GUTSI may be used by the device 202 in all signaling exchanged between the device 202 and the SME. In one aspect, the GUTSI can be provided by the device 202 outside a NAS payload (where the payload includes a message between the device 202 and the SME) to identify to which device 202 the NAS payload (transported between the device 202 and the connectivity serving node 210, 310, 410) belongs. In another example, the GUTSI may be provided by the device 202 inside a NAS payload. The GUTSI may be used to differentiate, in the connectivity serving node 210, 310, 410 to which SME the signaling sent from the device 202 is directed. For instance, when a device-to-SME NAS message (e.g., device-SME NAS message) is encapsulated in the NAS between the device 202 and the connectivity serving node 210, 310, 410, the GUTSI may be provided by the device 202 in association to the device-SME NAS message to indicate to the connectivity serving node 210, 310, 410 which SME to send the NAS message to, and which device 202 the device-SME NAS message corresponds to.

In an aspect, the GUTSIAC 508 (where "AC" may indicate "access") may be a GUTSI allocated to the device 202 corresponding to the connectivity context 224 (e.g., the EMM context).

The Temporary Transport Identifier (TTI) (e.g., included in a third grouping 706 and in a fourth grouping 708 of identifiers) may be allocated by an SME such as SME A 212, 312, 412 and/or SME B 214, 314, 414 for a service context between the device 202 and the SME. The TTI may be allocated to identify in the connectivity serving node 210, 310, 410 the relationship between a service context (e.g., an ESM context) of the device 202 and the corresponding SME. Upon receiving signaling containing the TTI, the connectivity serving node 210, 310, 410 may use the TTI to identify the corresponding device 202 or SME and forward the signaling to the identified device 202 or SME.

The IMSI 516 may identify the device 202 with the connectivity serving node 210, 310, 410 (e.g., the HMME). In an aspect, the IMSI 516 can be a permanent identifier assigned, for example, to a universal subscriber identity module (USIM) card. In an aspect, the IMSI 516 can be associated with a subscriber and stored in a permanent provider database such as the H-AAA server 244.

The S-TMSI and/or the P-TMSI (e.g., included in second grouping 704 of identifiers) may identify the device 202 with the connectivity serving node 210, 310, 410 (e.g., the HMME). The S-TMSI and/or the P-TMSI may be created by the connectivity serving node 210, 310, 410 (e.g., the HMME), for example, during an attach procedure. The S-TMSI and/or the P-TMSI may be a short form of the GUTI assigned to the device 202. In an aspect, the S-TMSI and/or the P-TMSI may be allocated by a connectivity serving node (e.g., HMME). In an aspect, the S-TMSI and/or the P-TMSI may identify a connectivity context (e.g., a connectivity context that may be shared by one or more service contexts). Optionally, if the connectivity context includes a service context (e.g., an ESM context), then an SCID may additionally or alternatively identify a connectivity context.

The C-RNTI 506 may identify the NAS management layer 221. The C-RNTI 506 may be used for exchanges between the device 202 and a network node (e.g., RAN or eNB of the RAN). In an aspect, the network node (e.g., RAN or eNB of the RAN) assigns the C-RNTI 506 to the device 202 to identify the device 202 during exchange of information over-the-air.

The Service Context Identifier (SCID) and Temporary-Service Context Identifier (T-SCID) may be used to identify a given service context. In an optional aspect, when a given connectivity context (e.g., an EMM context) includes a service context (e.g., an ESM context), the SCID and/or T-SCID may be used to identify the given connectivity context.

In FIG. 5, according to one example, the first service context 208 may be identified by, for example, a GUTSI1 502, an SCSI1 503, and/or a T-SCSI1 512. The GUTSI1 502, the SCSI1 503, and/or the T-SCSI1 512 may be used for exchanges between the device 202 and an SME such as SME A 212, SME A 312, and SME A 412. The second service context 209 may be identified by, for example, a GUTSI2 504, an SCSI2 505, and/or a T-SCSI2 514. The GUTSI2 504, the SCSI2 505, and/or the T-SCSI2 514 may be used for exchanges between the device 202 and an SME such as SME B 214, SME B 314, and SME B 414. The NAS management layer 221 may be identified by, for example, a C-RNTI 506, where the C-RNTI 506 may be used for exchanges between the device 202 and the network nodes 220 (e.g., RAN, eNB of the RAN, an AP). The connectivity context 224 may be identified by, for example, a GUTSIAC 508, where the GUTSIAC 508 may be used for exchanges between the device 202 and a connectivity serving node 210, 310, 410. The device 202 may be identified by, for example, an IMSI 516, where the IMSI 516 may be used for exchanges between the device 202 and a connectivity serving node 210, 310, 410.

In FIG. 6 and FIG. 7, the network nodes 220 (e.g., RAN, eNB of the RAN, an AP) may identify a device 202 with one or more of a first grouping 602, 702 of identifiers. The first grouping 602, 702 may include, for example, a C-RNTI and/or a GUTI. The network nodes 220 may provide a radio access bearer (RAB) context for all contexts including, for example, the first service context 208, the second service context 209, and the connectivity context 224.

In an aspect, the connectivity context 224 may include a second grouping 604, 704 of identifiers. The second grouping 604, 704 may include, for example, an IMSI or some other connectivity identifier (connectivity ID) for the device 202 or for the connectivity logical context 222 of the device 202. The second grouping 604, 704 may further include, for example, the GUTI, an S-TMSI, and/or a P-TMSI. The second grouping 604, 704 may include, for example, an optional SCID (e.g., if the connectivity context included a service context (e.g., an ESM context)). The second grouping 604, 704 may further include, for example, a GUTSIAC (e.g., to identify the ESM context). The second grouping 604, 704 may further include, for example, an identifier of a subscription profile of the connectivity logical context 222 of the device 202, a connectivity serving node identifier (e.g., an HMME ID), and/or a serving gateway (SGW) identifier and/or address (SGW ID/address).

In an aspect, the first service context 208 may include a third grouping 606, 706 of identifiers. The third grouping 606, 706 may include, for example, a service context identifier for the first service context 208 (e.g., an SCID1), a temporary service context identifier for the first service context 208 (e.g., T-SCID1), a GUTSI for the first service context 208 (e.g., GUTSI1), an identifier of a subscription profile for the first service context 208 (e.g., subscription profile 1), a connectivity serving node identifier (e.g., an HMME ID), and/or a serving gateway (SGW) identifier and/or address (SGW ID/address).

In an aspect, the second service context 209 may include a fourth grouping 608, 708 of identifiers. The fourth grouping 608, 708 may include, for example, a service context identifier for the second service context 209 (e.g., an SCID2), a temporary service context identifier for the second service context 209 (e.g., T-SCID2), a GUTSI for the second service context 209 (e.g., GUTSI2), an identifier of a subscription profile for the second service context 209 (e.g., subscription profile 2), a connectivity serving node identifier (e.g., an HMME ID), and/or a serving gateway (SGW) identifier and/or address (SGW ID/address).

In an aspect, a fifth grouping 610, 710 of identifiers may be stored at a server such as, for example, the H-AAA server 244. The fifth grouping 610, 710 may include, for example, an IMSI or other connectivity identifier of the device 202 and/or an identifier of a subscription profile of the device 202. In another example, the fifth grouping 610, 710 may include an IMSI or other connectivity identifier of the connectivity logical context 222 of the device 202 and/or an identifier of a subscription profile of the connectivity logical context 222 of the device 202.

In an aspect, a sixth grouping 612, 712 of identifiers may be stored at a server such as, for example, the service AAA server A 216. The sixth grouping 612, 712 may include, for example, a service context identifier of first service context 208 of the logical context A 203 of the device 202 (e.g. SCID1) and/or an identifier of a subscription profile of the first service context 208 the device 202 (e.g. subscription profile 1).

In an aspect, a seventh grouping 614, 714 of identifiers may be stored at a server such as, for example, the service AAA server B 218. The seventh grouping 614, 714 may include, for example, a service context identifier of the second service context 209 of the logical context B 205 of the device 202 (e.g. SCID2) and/or an identifier of a subscription profile of the second service context 209 the device 202 (e.g. subscription profile 2).

The device 202 may provide, for example, during a request to establish a service connection or service context, an identifier used by the device 202 to identify a network or service for which the service context establishment is being requested. For example, the identifier may be an access point name (APN) or a service anchor point identifier (SAPI).

Exemplary Radio Link Establishment Process when Device is in Idle Mode

Figure 8:
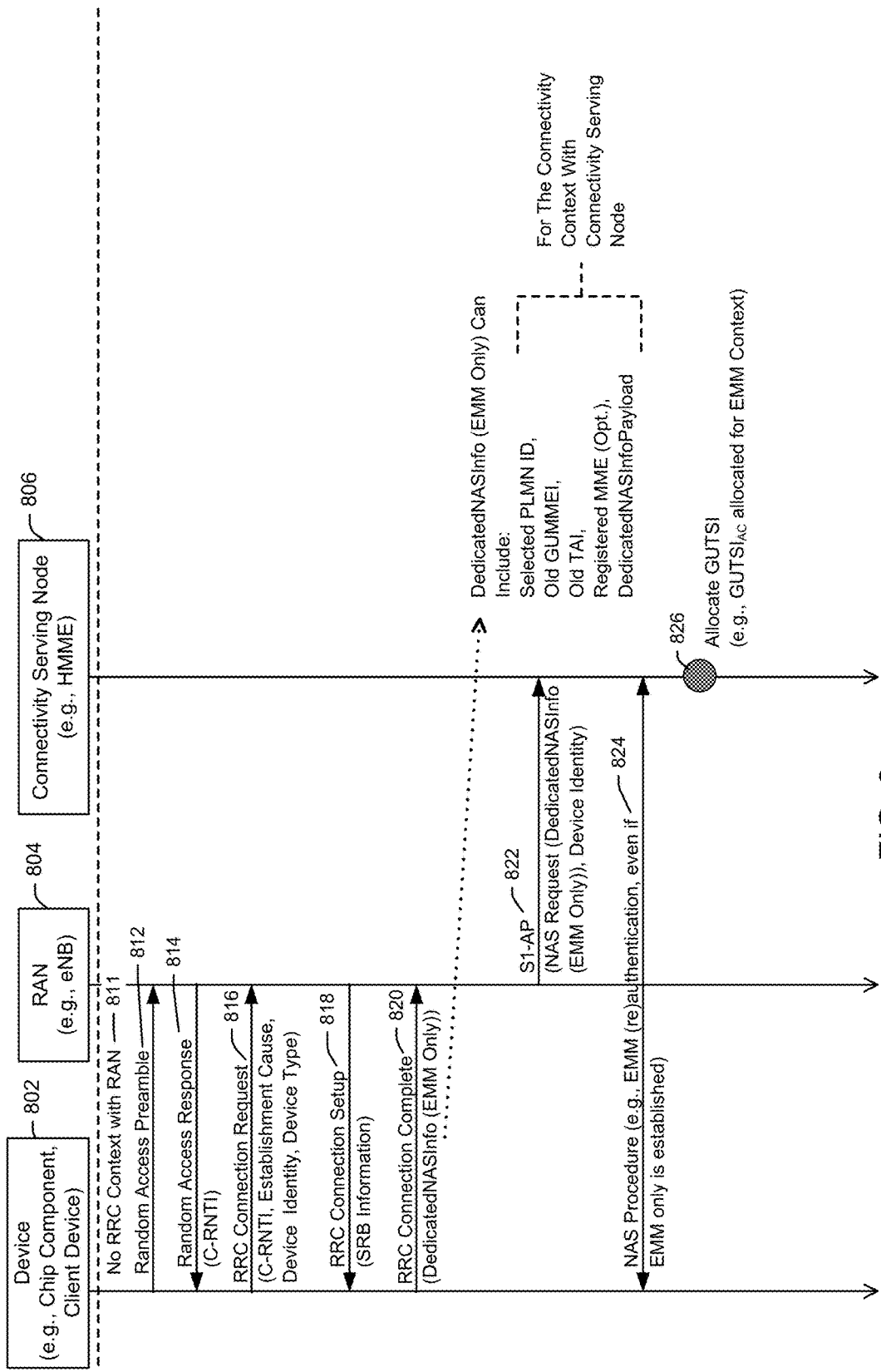
FIG. 8 is a flow diagram illustrating a first process performed between a device, a RAN, and a connectivity serving node to establish a single radio link using a connectivity context at the device.

FIG. 8 is a flow diagram illustrating a first process performed between a device 802 (e.g., chip component, client device), a RAN 804 (e.g., eNB), and a connectivity serving node 806 (e.g., HMME) to establish a single radio link (e.g., RRC connection) using a connectivity context (e.g., an EMM context) at the device 802. The connectivity context may be shared by one or more of the service contexts at the device 802. In one example, the process illustrated in FIG. 8 may be used to establish a radio link for an EMM context with the connectivity serving node 806. In an example where an EMM context optionally includes an ESM context, the process illustrated in FIG. 8 may be used to establish a radio link for EMM context and the ESM context with the connectivity serving node 806.

In one example, the process may be used when the device 802 has no RRC context 811 with the RAN 804 (e.g., no connectivity context with the RAN 804). In other words, there is no context related to the device 802 in the RAN 804.

In the example of FIG. 8, the device 802 may perform the following to establish a radio link. A random access preamble 812 may be sent from the device 802 to the RAN 804. The device 802 may obtain a random access response 814 from the RAN 804. The RAN 804 may allocate a C-RNTI, which may be included in the random access response 814.

The device 802 may send an RRC connection request 816 message to the RAN 804. The RRC connection request 816 message may include, for example, the C-RNTI (allocated by the RAN 804), a cause (e.g., an establishment cause), and a device identity. In an aspect, the device identity may be the identity of the device 802 used in communications with the connectivity serving node 806. Examples of the device identity may include an IMSI, a P-TMSI, and/or an S-TMSI. In an aspect, the RRC connection request 816 message may further include, for example, a device type. Optionally, if context establishment was for a connectivity context that included a service context, the RRC connection request 816 message may further include, for example, a service type.

In an implementation, for example, one or more of the device type, the optional service type, a selected PLMN (e.g., identifier of the selected network), and one or more identifiers of radio access points the device 802 is connected to (including, for example, an eNB identifier, a cell identifier, a Wi-Fi AP identifier, etc.) may be provided by the device 802 in the RRC connection request 816 message and/or an RRC connection complete 820 message.

The device type may indicate to the network the type of device behavior for the device 802. For example, the device 802 may be an M2M device, a multimedia device, etc. The device type may be used by the RAN 804 and the connectivity serving node 806, for example, to differentiate the treatment of the device 802 with respect to other devices. Differentiation of treatment, for example, may include differentiation of mobility management treatment, security treatment, etc.

The cause, also referred to herein as the establishment cause, may be used, for example, to ensure that the RAN 804 selects a connectivity serving node (e.g., an HMEE) that can support separate connectivity (e.g. EMM) and service (e.g. ESM) contexts, and not a traditional MME for the context being established.

In one implementation, the device 802 may send such an establishment cause by setting a "cause" parameter in the RRC connection request 816 message to "mo-Signalling-separate-context" and by providing an indication that the RRC connection request 816 message is for "connectivity context only", "EMM only", "connectivity and service contexts", "EMM and ESM", or some other indication that signifies whether the RRC connection request 816 message is for connectivity context, service context, or connectivity and service contexts.

In an alternative implementation, the device 802 may send such an establishment cause by setting the "cause" parameter in the RRC connection request 816 message to "mo-Signalling" as in current systems, but by also providing a pre-defined indication (e.g., a new indication) that the RRC connection request 816 message is for establishment of a context (e.g., a connectivity context) with a connectivity serving node that can support separate connectivity (e.g. EMM) and service (e.g. ESM) contexts (e.g., an HMME), and an indication that the RRC connection request 816 message is, for example, for "connectivity context only", "EMM only", "connectivity and service contexts", "EMM and ESM", or some other indication that signifies whether the RRC connection request 816 message is for connectivity context, service context, or connectivity and service contexts.

The device 802 may obtain an RRC connection setup 818 message. The RRC connection setup 818 message may include signaling radio bearer (SRB) information.

The device 802 may send an RRC connection complete 820 message to the RAN 804. The RRC connection complete 820 message may include dedicated NAS information (DedicatedNASInfo).

The DedicatedNASInfo may include, for example, the same information as in an Evolved Universal Terrestrial Radio Access Network (EUTRAN) for an ESM context (e.g., a PDN connection request message) in a case where an establishment request is for EMM and ESM establishment.

In addition, according to aspects described herein, the DedicatedNASInfo may include an indication associated to the DedicatedNASInfo that the request is for establishment of connectivity with an connectivity serving node (e.g., an HMME) that can support separate connectivity (e.g. EMM) and service (e.g. ESM) contexts.

In an additional or alternative aspect, the DedicatedNASInfo may include an indication that the RRC connection request 816 message is, for example, for "connectivity context only" or "EMM only", or some other indication that signifies whether the RRC connection request 816 message is for a connectivity context (e.g., EMM context) (without a service context). The DedicatedNASInfo may include a DedicatedNASInfoPayload, which may include an attach request message (e.g., an EMM message). For example, in the additional or alternative implementation, the DedicatedNASInfo may include only an ATTACH REQUEST NAS message that does not contain a PDN connection request.

In an aspect, the DedicatedNASInfo may additionally or alternatively include, for example, one or more of device type, service type, and one or more identifiers of the radio access points the device 802 is connected to (including, for example, an eNB identifier, a cell identifier, a Wi-Fi AP identifier, etc.). The DedicatedNASInfo may also include an Access Point Name (APN) and/or a Service Anchor Point Identifier (SAPI) that may be used by the device 802 to identify the network or service for which the context establishment is being requested.

In an aspect, in case of connectivity context establishment only (e.g., EMM only), the DedicatedNASInfo may include only information related to the establishment of the connectivity context (i.e. EMM information only). In an aspect, in case of connectivity context establishment only (e.g., EMM only), the DedicatedNASInfo may include only an ATTACH REQUEST NAS message that does not include a PDN connection request. In an aspect, in case of connectivity context establishment only (e.g., EMM only), the DedicatedNASInfo may include, for example, an identifier of a selected network (e.g., a Selected PLMN ID), an old Globally Unique MME Identity (GUMMEI), and an old Tracking Area Identifier (TAI). Optionally, in an aspect, in case of connectivity context establishment only (e.g., EMM only), the DedicatedNASInfo may include an identify of a registered MME.

Upon obtaining the RRC connection complete 820 message, the RAN 804 may retrieve the connectivity serving node 806 corresponding to the C-RNTI, and the RAN 804 may send an S1 application protocol (S1-AP) 822 message to the connectivity serving node 806.

The S1-AP 822 message may include a NAS Request and may also include the device type (e.g., received from the device 802) and/or the device identity. In an aspect, the RAN 804 (e.g., eNB) may use, for example, an eNB-UE-S1APID to identify the device 802 with the connectivity serving node 806.

A NAS procedure 824 may take place. During the NAS procedure 824, the connectivity serving node 806 may perform authentication or re-authentication of the EMM context (even if "EMM only" is established) of the device 802. The connectivity serving node 806 may store the device type provided by the device 802 in the EMM context.

In one aspect, the NAS procedure 824 may include skipping an authentication and authorization procedure, wherein the connectivity serving node 806 may store an indication that the authentication and authorization procedure was skipped. Additionally or alternatively, the connectivity serving node 806 may store an indication that only service connections specific to one or more of service types, device types, PLMNs, and identifiers of radio access points the device 802 is connected to are allowed according to a profile (e.g., subscription profile) of the device 802 and/or according to a local connectivity serving node configuration. In an aspect, the profile (e.g., subscription profile) of the device 802 may be obtained, for example, from a network AAA server.

The NAS procedure 824 may include GUTSI (Globally Unique Temporary Service Identity) allocation. For example, the connectivity serving node 806 may allocate 826 a GUTSI. A GUTSI may be allocated to the device 802 corresponding to the context being established. A GUTSI allocated to the device 802 corresponding to an EMM context may be referred to herein as a GUTSIAC (where "AC" may indicate "connectivity" or "access"). A GUTSI allocated to the device 802 corresponding to an ESM context may be referred to herein as a GUTSIi, where i can be an index of the service context and where i can be any non-zero integer (e.g., GUTSI1, GUTSI2). For example, an EMM context may be associated with GUTSIAC and the ESM context be associated with GUTSIi, where GUTSIAC is different from GUTSIi.

In addition, if the NAS Request also includes a request for service context establishment, the connectivity serving node may perform a PDN GW (PGW) selection based on, for example, the APN or SAPI, and may further perform an SGW selection.

Figure 9:
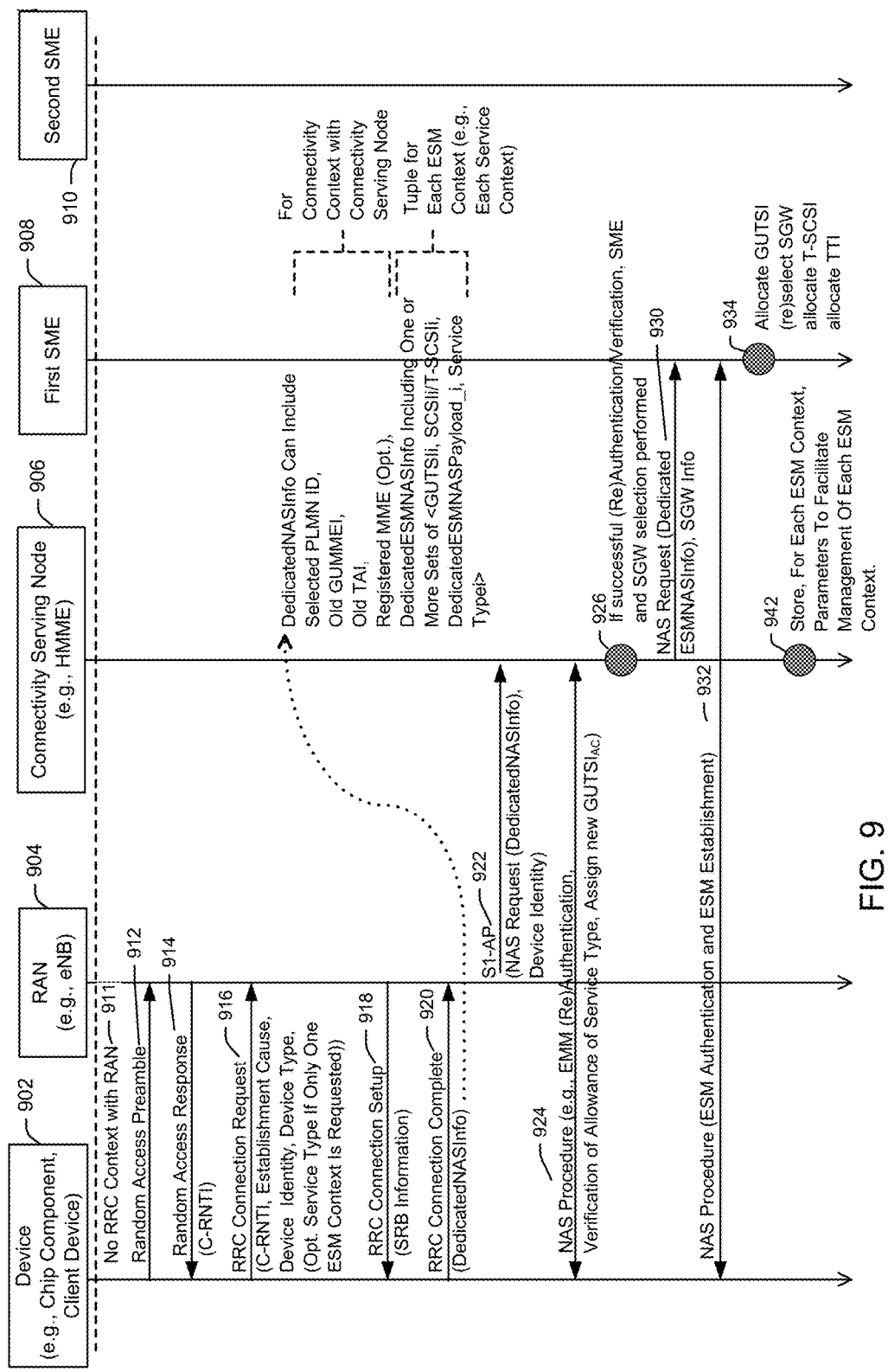
FIG. 9 is a flow diagram illustrating a second process performed between a device, a RAN, and a connectivity serving node to establish a single radio link using a connectivity context and a service connection with a first SME using a first service context, when the EMM context between the device and the connectivity serving node already exists.

FIG. 9 is a flow diagram illustrating a second process performed between a device 902 (e.g., chip component, client device), a RAN 904 (e.g., eNB), and a connectivity serving node 906 (e.g., HMME) to establish a single radio link (e.g., RRC connection) using a connectivity context (e.g., an EMM context) and a service connection with a first SME 908 using a first service context (e.g., a first ESM context), when the EMM context between the device 902 and the connectivity serving node 906 already exists. The connectivity context may be shared by one or more service contexts including the first service context at the device 902.

In one example, the process may be used when the device 902 is idle and the device 902 has no RRC context 911 with the RAN 904 (e.g., no connectivity context with the RAN 904, no RRC session). In other words, there is no context related to the device 902 in the RAN 904. For example, a device context may exist at the connectivity serving node 906 and at the first SME 908 when the device 902 is in the idle mode, however, there is no device context at the RAN 904. When the device 902 switches to a connected mode, the RAN 904 may establish new device contexts based on, for example, the EMM context and ESM context, for which NAS signaling is performed between the device 902 and the connectivity serving node 906 and between the device 902 and first SME 908. Authentication may be optionally used if the connectivity serving node 906 and/or first SME 908 have lost or refresh the device context for some reason. Otherwise, the authentication may be implicit by verifying the NAS messages based on, for example, the existing security contexts.

In the example of FIG. 9, the device 902 may perform the following to establish a radio link. A random access preamble 912 may be sent from the device 902 to the RAN 904. The device 902 may obtain a random access response 914 from the RAN 904. The RAN 904 may allocate a C-RNTI, which may be included in the random access response 914.

The device 902 may send an RRC connection request 916 message to the RAN 904. The RRC connection request 916 message may include, for example, the C-RNTI (allocated by the RAN 904), a cause (e.g., an establishment cause), and a device identity. In an aspect, the device identity may be the identity of the device 902 used in communications with the connectivity serving node 906. Examples of the device identity may include an IMSI, a P-TMSI, and/or an S-TMSI. In an aspect, the RRC connection request 916 message may further include, for example, a device type and/or a service type.

In an implementation, for example, one or more of the device type, the service type, a selected PLMN (e.g., identifier of the selected network), and one or more identifiers of radio access points the device 902 is connected to (including, for example, an eNB identifier, a cell identifier, a Wi-Fi AP identifier, etc.), for each ESM context being established, may be provided by the device 902 in the RRC connection request 916 message and/or the RRC connection complete 920 message.

The device type may indicate to the network a type of device behavior for the device 902. For example, the device 902 may be an M2M device, a multimedia device, etc. The device type may be used by the RAN 904 and the connectivity serving node 906, for example, to differentiate the treatment of the device 902 with respect to other devices. Differentiation of treatment, for example, may include differentiation of mobility management treatment, security treatment, etc.

The cause, also referred to herein as the establishment cause, may be used, for example, to ensure that the RAN 904 selects a connectivity serving node (e.g., an HMME) that can support separate connectivity (e.g. EMM) and service (e.g. ESM) contexts, and not a traditional MME for the context being established.

In one implementation, the device 902 may send such an establishment cause by setting a "cause" parameter in the RRC connection request 916 message to "mo-Signalling-separate-context" and by providing an indication that the RRC connection request 916 message is for "connectivity context only", "EMM only", "connectivity and service contexts", "EMM and ESM", or some other indication that signifies whether the RRC connection request 916 message is for connectivity context, service context, or connectivity and service contexts.

In an alternative implementation, the device 902 may send such an establishment cause by setting the "cause" parameter in the RRC connection request 916 message to "mo-Signalling" as in current systems, but by also providing a pre-defined indication (e.g., a new indication) that the RRC connection request 916 message is for establishment of a context with a connectivity serving node that can support separate connectivity (e.g. EMM) and service (e.g. ESM) contexts (e.g., an HMME), and an indication that the RRC connection request 916 message is, for example, for "connectivity context only", "EMM only", "connectivity and service contexts", "EMM and ESM", or some other indication that signifies whether the RRC connection request 916 message is for connectivity context, service context, or connectivity and service contexts.

The device 902 may obtain an RRC connection setup 918 message. The RRC connection setup 918 message may include signaling radio bearer (SRB) information.

The device 902 may send an RRC connection complete 920 message to the RAN 904. The RRC connection complete 920 message may include dedicated NAS information (DedicatedNASInfo).

In the example of FIG. 9, the device 902 may include one set of dedicated ESM NAS information (DedicatedESM-NASInfo) in the DedicatedNASInfo, because, for example, one ESM context is being established. One set of DedicatedESMNASInfo may be included for each ESM context to be established. In other words, one tuple of DedicatedESMNASInfo may be included for each ESM context to be established. A plurality of sets or tuples are indexed herein using the letter "i", where i is an integer greater than 0.

In an aspect, the DedicatedNASInfo may include an indication associated to the DedicatedNASInfo that the request is associated with a connectivity serving node (e.g., an HMME) that can support separate connectivity (e.g. EMM) and service (e.g. ESM) contexts.

In an additional or alternative aspect, the DedicatedNASInfo may include an indication that the RRC connection request 916 message is, for example, for "service context only" or "ESM only", or some other indication that signifies that the RRC connection request 916 message is for a service context (e.g., ESM context) (where, for example, a connectivity context is already established).

An ESM NAS request (e.g., a PDN connection request, a service connection request) corresponding to a service context (e.g., the ESM context) being established between the device 902 and an SME (e.g., the first SME 908) may be included in the DedicatedNASInfo. The ESM NAS request may be referred to herein as a NAS request. The device identity may also be included in the DedicatedNasInfo. The device identity may be an SCSI (or a T-SCSI previously allocated to the device 902 by an SME). The SCSI may be, for example, an IMSI or a P-TMSI or S-TMSI allocated, for example, in case of SIM/USIM based authentication methods.

The device 902 may also provide, in the DedicatedESMNASInfo in association with the DedicatedNASInfo, a GUTSI that may have been allocated to the device or a logical context of the device.

The device 902 may also provide, in the DedicatedESMNASInfo in association with the DedicatedNASInfo, the SCSI or T-SCSI in order to enable the connectivity serving node 906 to select or reselect an SME for the device 902 based on, for example, the SCSI or T-SCSI.

The device 902 may also provide, in the DedicatedESMNASInfo in association with the DedicatedNASInfo, a DedicatedESMNASPayload that may include, for example, a PDN connectivity establishment request message or a PDN connection request (e.g., an ESM message).

The device 902 may also provide, in the DedicatedESMNASInfo in association with the DedicatedNASInfo, an indication of service type in order to identify the type of service or type of connectivity that the device 902 is attempting to establish, in order to enable the connectivity serving node 906 to select or reselect an SME for the device 902.

The device 902 may also provide, in the DedicatedESMNASInfo in association with the DedicatedNASInfo, a PLMN selected when the EMM context with the connectivity serving node 906 was established.

The device 902 may also provide, in the DedicatedESMNASInfo in association with the with the DedicatedNASInfo, one or more identifiers of the radio access points the device 902 is connected to (including, for example, an eNB identifier, a cell identifier, a Wi-Fi AP identifier, etc.).

The device 902 may also provide, in the DedicatedESMNASInfo in association with the with the DedicatedNASInfo, an indication of the Access Point Name (APN) and/or a Service Anchor Point Identifier (SAPI) used by the device 902 to identify the network or service for which the service context establishment is being requested.

Upon obtaining the RRC connection complete 920 message, the RAN 904 may retrieve the connectivity serving node 906 corresponding to the C-RNTI and may send the DedicatedNASInfo to the connectivity serving node 906. The DedicatedNASInfo includes the DedicatedESMNASInfo. The DedicatedESMNASInfo can be a container carrying a NAS request, as understood by the RAN 904, the connectivity serving node 906, the first SME 908, and the second SME 910.

The RAN 904 may send the DedicatedNASInfo including the DedicatedESMNASInfo over an S1-AP 922 message to the connectivity serving node 906. The S1-AP 922 message may include a NAS Request and may also include the device type (e.g., received from the device 902) and/or the device identity. In an aspect, the RAN 904 may use an eNB-UE-S1APID to identify the device with the connectivity serving node 906 (e.g., HMME).

The RAN 904 may include an indication (provided, for example, in addition to the NAS signaling in a new or modified information element (IE) in the RRC connection complete 920 message) that the NAS signaling corresponds to a different service context/device identity with respect to an existing service context between the device 902 and the connectivity serving node 906 (for example, where the connectivity serving node supports multiple concurrent service contexts shared with a single connectivity context).

A NAS procedure 924 may take place. The NAS procedure 924 may include authentication or re-authentication of the EMM context of the device 902 (e.g., EMM authentication/EMM re-authentication).

In one example, the NAS procedure 924 may include skipping authentication and authorization, wherein the connectivity serving node 906 may store an indication that authentication and authorization was skipped. Additionally or alternatively, the connectivity serving node 906 may store an indication that only service connections specific to one or more of service types, device types, PLMNs, and identifiers of radio access points the device 902 is connected to are allowed according to a profile (e.g., subscription profile) of the device 902 and/or according to a local connectivity serving node configuration. In an aspect, the profile (e.g., subscription profile) of the device 902 may be obtained, for example, from a network AAA server.

The NAS procedure 924 may include allocation of a new GUTSI (Globally Unique Temporary Service Identity). In one example, the connectivity serving node 906 may re-authenticate the device 902 and may assign a new GUTSIAC.

The connectivity serving node 906, for each set of DedicatedESMNASInfo information in the DedicatedNASInfo, may verify whether the service type provided by the device 902 in association with the ESM NAS Request is allowed. The verification may be based, for example, on one or more of the device subscription profile, the device type stored in the EMM context, an optional stored indication that only a specific service connection is allowed because authentication was skipped, the APN, the SAPI, and local policy/configuration. If the service type is not allowed, the connectivity serving node 906 may reject the establishment and provide a rejection cause. The rejection cause may indicate, for example, that the service type is not allowed for the identified device type and/or the service type is not allowed for an unauthenticated device.

In an aspect, if the service connection request is allowed, the connectivity serving node 906 may, for example, select an SME. It will be understood that references made herein to an SME apply to an SME physical node and/or an SME logical node. Accordingly, selecting an SME encompasses selecting an SME physical node and/or an SME logical node. The selection may be performed based on, for example, one or more of the GUTSI, SCSI, T-SCSI, service type, and local configuration. The selection may be additionally or alternatively be performed based on, for example, one or more of the PLMN, the APN, and the SAPI, provided by the device 902 to select the SME. The connectivity serving node 906 may also use the one or more identifiers of the radio access points the device 902 is connected to (including, for example, an eNB identifier, a cell identifier, a Wi-Fi AP identifier, etc.) in the selection process in order to determine a location-appropriate SME (e.g. an SME that serves a specific geographical area).

Furthermore, if the service connection request is allowed, the connectivity serving node 906 may prepare SGW Information (SGW Info). If a single gateway (e.g., one SGW) is used and if the device 902 has no existing ESM contexts in the connectivity serving node 906, the connectivity serving node 906 may select a SGW based on, for example, one or more of the service type, the PLMN, the one or more identifiers of the radio access points the device 902 is connected to, the APN, and the SAPI. In an aspect, the connectivity serving node 906 may indicate whether an SME can override the SGW selection by setting an Override Flag, and provide the Selected SGW and the Override Flag in the SGW Info.

If a single gateway is used and if the device 902 already has existing ESM contexts, the connectivity serving node 906 may verify if the stored Selected SGW is suitable based on, for example, one or more of the service type, the PLMN, the one or more identifiers of the radio access points the device is connected to, the APN and the SAPI. If not suitable, the connectivity serving node 906 may select a SGW based on, for example, one or more of the service type, the PLMN, and the one or more identifiers of the radio access points the device is connected to. In an aspect, the connectivity serving node 906 may indicate whether an SME can override the SGW selection by setting an Override Flag, and provides the Selected SGW and the Override Flag in the SGW Info. However, if suitable, the connectivity serving node 906 may retrieve a stored Selected SGW, SGWSelectingSME (that identifies which SME selected the Selected SGW), and Override Flag, and provide the stored Selected SGW, SGWSelectingSME, and the Override Flag in the SGW Info to the SME.

If multiple gateways are used (e.g., a multiple SGW model), the connectivity serving node 906 may select a SGW based on, for example, one or more of the service type, the PLMN, and the one or more identifiers of the radio access point points the device is connected to, and provide the Selected SGW in the SGW Info.

The connectivity serving node 906, for each set of DedicatedESMNASInfo information in the DedicatedNASInfo, may send 930 the NAS Request, including the corresponding NAS information (e.g., the DedicatedESMNASInfo including GUTSI, SCSI/T-SCSI, DedicatedESMNASPayload, and service type) and the SGW Info (e.g., the selected SGW, Override Flag) to the SME selected (e.g., the first SME 908). In one example, the connectivity serving node 906 may send the DedicatedESMNASInfo, including the service type, the PLMN, and one or more identifiers of the radio access points the device 902 is connected to, as provided by the device 902, to the selected SME. In an aspect, for example, the connectivity serving node 906 may also send the SGW Info and a selected PGW if the connectivity serving node 906 selected a PGW. In an implementation, the connectivity serving node 906 may select the PGW based on, for example, the APN or SAPI.

A NAS procedure may take place between the device 902 and the first SME 908 during which ESM authentication and ESM establishment may occur 932.

In one example, the first SME 908 may retrieve credentials and the device subscription profile corresponding to the SCSI or T-SCSI (e.g., by interacting with a serving AAA server (e.g., service AAA server A 140, FIG. 1) corresponding to the SCSI or T-SCSI). The first SME 908 may authenticate the device 902 based on the credentials.

Upon successful authentication or skipping the authentication, the first SME 908 may allocate 934 a GUTSI (Globally Unique Temporary Service Identity) and/or a (new) Temporary SCSI (T-SCSI) to the device 902. The first SME 908 may additionally or alternatively allocate 934 a Temporary Transport Identifier (TTI) that may be used to identify, in the connectivity serving node 906, the relationship between an ESM context of the device 902 and the corresponding first SME 908.

The first SME 908 may verify that a PLMN provided by the device 902 is authorized, based on, for example, one or more of a local configuration/policy, the device subscription profile, and a subscriber profile. If not allowed, the first SME 908 may send the device 902 an ESM rejection that can include the cause of the rejection.

The first SME 908 may verify that the service type provided by the device 902, if any, is authorized. Verification may be based on, for example, local configuration/policy and the device subscription profile. Verification may optionally be based on, for example, the one or more identifiers of the radio access points the device 1002 is connected to, the APN, and/or the SAPI. The first SME 908 may authenticate the device 902 based on, for example, SCSI or T-SCSI, based on, for example, the credentials from the device subscription profile. Authenticating the device 902 in the first SME 908 may include skipping the authentication if the first SME 908 determines that the service connection request is, for example, a service connection request for an emergency service.

In an aspect, the authentication and connectivity/service establishment messages between the device 902 and the first SME 908 may be transported as a payload in NAS messages between the device 902 and the connectivity serving node 906. For device 902 to first SME 908 messages, the connectivity serving node 906 may forward the encapsulated message to the first SME 908. For first SME 908 to device 902 messages, the connectivity serving node 906 may encapsulate the message in a NAS message to the device 902.

The first SME 908 may deliver to the connectivity serving node 906 the first message directed to the device 902 to be encapsulated together with the GUTSI. In one example, the first message may optionally also be encapsulated with the SCSI/T-SCSI. In another example, the first SME 908 may provide the TTI.

When sending further messages to the first SME 908, the device 902 may encapsulate the message in a NAS message sent to the connectivity serving node 906 by also providing the GUTSI and, if allocated, the TTI so that the connectivity serving node 906 knows to which SME the encapsulated message should be forwarded.

For a single SGW model, the first SME 908 may select a new SGW, or reselect the SGW, if the override flag is not set, based on, for example, one or more of the service type, the SCSI, the subscription associated with the SCSI, the one or more identifiers of the radio access points the device 902 is connected to, the PLMN provided by the device 902 (if any), local policy, etc., and return the selected SGW to the connectivity serving node 906. The first SME 908 may also set, for example, based on, for example, one or more of the service type, the SCSI, the subscription associated with the SCSI, local policy, etc., the Override Flag so that other SMEs do not override the SGW selection.

For a multiple SGW model, the first SME 908 may select a new SGW, or reselect the SGW, based on, for example, one or more of the service type, the SCSI, the subscription associated with the SCSI, the one or more identifiers of the radio access points the device is connected to, the PLMN provided by the device 902 (if any), local policy, the APN, the SAPI, etc., and return the selected SGW to the connectivity serving node 906.

In an aspect, if the connectivity serving node 906 selected a PGW, the connectivity serving node 906 may verify if the selected PGW is suitable based on, for example, one or more of the service type, the SCSI, the subscription associated with the SCSI, the one or more identifiers of the radio access points the device is connected to, the PLMN provided by the device 902 (if any), local policy, etc., and return the selected PGW to the connectivity serving node 906.

In an aspect, the connectivity serving node 906 may store 942, for example, in an EMM profile for the device 902, parameters that may facilitate establishment and/or management of the ESM context. In one example, the connectivity serving node 906 may store a mapping of an identifier of a service context (e.g., an SCID, a T-SCID), a GUTSI (e.g., GUTSI1), and a GUTSIAC for each ESM context. In one example, the connectivity serving node 906 may store, for each ESM context, a set of information received from the SME, which may include: for a single SGW model, if the SME selected a new SGW, the Selected SGW, SGWSelectingSME, and Override Flag; and for a multiple SGW model, the SGW selected by the SME or, if the SME did not select an SGW, the connectivity serving node 906 may store the SGW selected by the connectivity serving node 906.

In an aspect, the connectivity serving node 906 may correlate the ESM contexts using stored mapping between various GUTSIis and the GUTSIAC. In an example, the connectivity serving node 906 may correlate the ESM context described in connection with FIG. 9 for GUTSI via GUTSIAC. In an example, the connectivity serving node 906 may correlate the ESM context described in connection with FIG. 9 using the identifier of the service context (e.g., the SCID, the T-SCID), the GUTSIAC, and/or the GUTSI associated with the ESM context. Optionally, the connectivity serving node 906 may correlate the ESM context using the received SCSI/T-SCSI or TTI in relation to the GUTSI, as allocated by the connectivity serving node 906 upon EMM authentication or re-authentication.

The connectivity serving node 906 may also store the selected PGW for the ESM context. If the connectivity serving node 906 selected a PGW, the connectivity serving node 906 may verify if the selected PGW is suitable based on, for example, one or more of the service type, the SCSI, the subscription associated with the SCSI, the one or more identifiers of the radio access points the device is connected to, the PLMN provided by the device (if any), local policy, etc., and return the selected PGW to the connectivity serving node 906.

The first SME 908 may request the connectivity serving node 906 to allocate one or more radio access bearers (RABs) for the service connection.

The connectivity serving node 906 may provide to the RAN 904 the request for the allocation of one or more RABs, the Selected SGW, and the selected PGW. The RAN 904 may establish the RABs and store the corresponding selected SGW.

Figure 10:
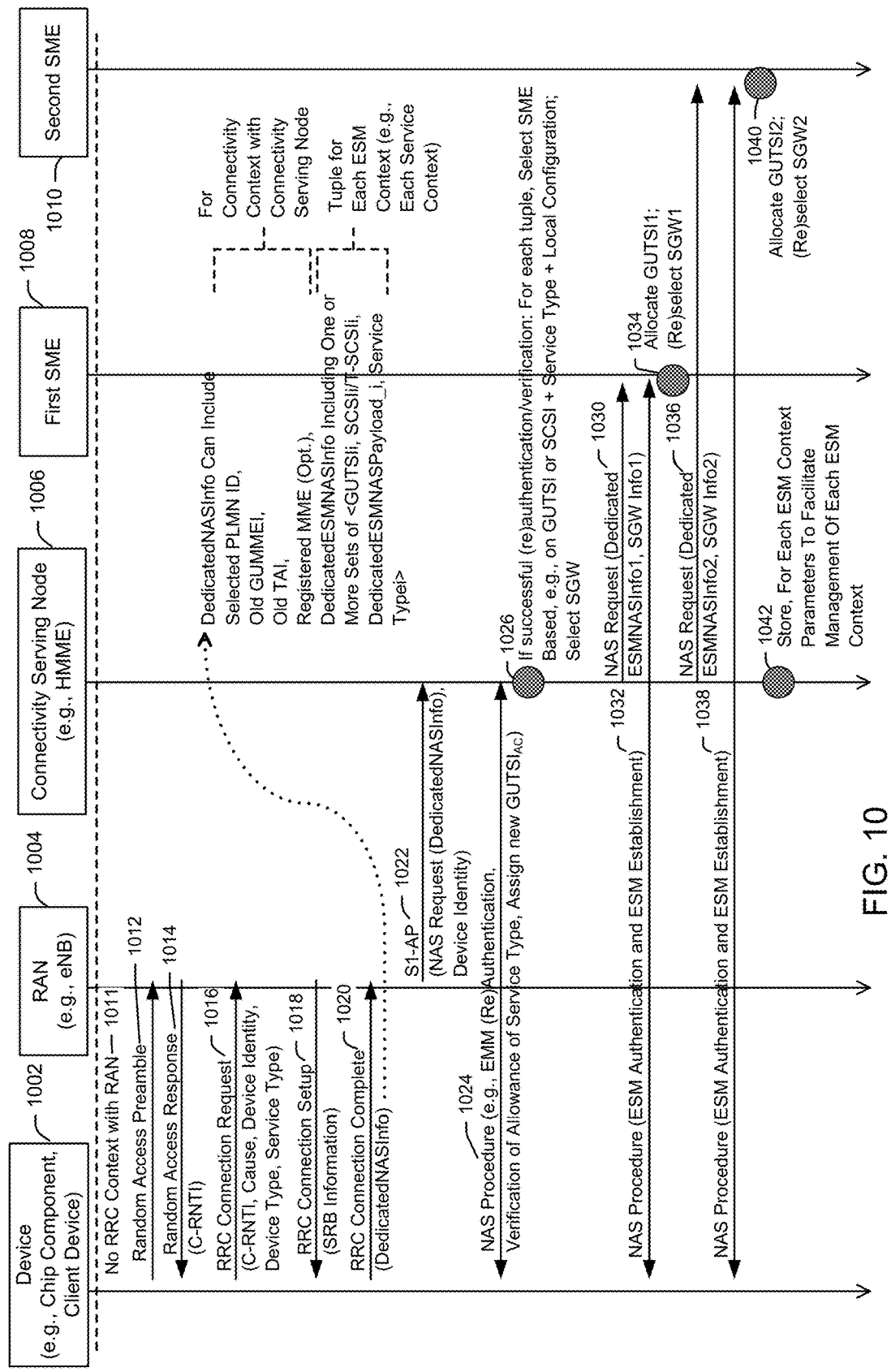
FIG. 10 is a flow diagram illustrating a third process performed between a device, a RAN, and a connectivity serving node 1006 to establish a single radio link using a connectivity context and a plurality of service connections with a plurality of SMEs using a corresponding plurality of service contexts sharing the connectivity context, when an EMM context between the device and the connectivity serving node already exists.

FIG. 10 is a flow diagram illustrating a third process performed between a device 1002 (e.g., chip component, client device), a RAN 1004 (e.g., eNB), and a connectivity serving node 1006 (e.g., HMME) to establish a single radio link (e.g., RRC connection) using a connectivity context (e.g., an EMM context) and a plurality of service connections with a plurality of SMEs using a corresponding plurality of service contexts (e.g., ESM contexts) sharing the connectivity context, when an EMM context between the device 1002 and the connectivity serving node 1006 already exists.

In one example, the process may be used when the device 1002 is idle and the device 1002 has no RRC context 1011 with the RAN 1004 (e.g., no connectivity context with the RAN 1004). In other words, there is no context related to the device 1002 in the RAN 1004.

In the example of FIG. 10, the device 1002 may perform the following to establish a radio link. A random access preamble 1012 may be sent from the device 1002 to the RAN 1004. The device 1002 may obtain a random access response 1014 from the RAN 1004. The RAN 1004 may allocate a C-RNTI, which may be included in the random access response 1014.

The device 1002 may send an RRC connection request 1016 message to the RAN 1004. The RRC connection request 1016 message may include, for example, the C-RNTI (allocated by the RAN 1004), a cause (e.g., an establishment cause), and a device identity In an aspect, the device identity may be the identity of the device 1002 used in communications with the connectivity serving node 1006. Examples of the device identity may include an IMSI, a P-TMSI, and/or an S-TMSI. In an aspect, the RRC connection request 1016 message may further include, for example, a device type and/or a service type.

In an implementation, for example, one or more of the device type, the service type, a selected PLMN (e.g., identifier of the selected network), and one or more identifiers of radio access points the device 1002 is connected to (including, for example, an eNB identifier, a cell identifier, a Wi-Fi AP identifier, etc.), for each ESM context being established, may be provided by the device 1002 in the RRC connection request 1016 message and/or the RRC connection complete 1020 message.

The device type may indicate to the network a type of device behavior for the device 1002. For example, the device 1002 may be an M2M device, a multimedia device, etc. The device type may be used by the RAN 1004 and the connectivity serving node 1006, for example, to differentiate the treatment of the device 1002 with respect to other devices. Differentiation of treatment, for example, may include differentiation of mobility management treatment, security treatment, etc.

The cause, also referred to herein as the establishment cause, may be used, for example, to ensure that the RAN 1004 selects a connectivity serving node (e.g., an HMME) that can support separate connectivity (e.g. EMM) and service (e.g. ESM) contexts, and not a traditional MME for the context being established.

In one implementation, the device 1002 may send such an establishment cause by setting a "cause" parameter in the RRC connection request 1016 message to "mo-Signalling-separate-context" and by providing an indication that the RRC connection request 1016 message is for "connectivity context only", "EMM only", "connectivity and service contexts", "EMM and ESM", or some other indication that signifies whether the RRC connection request 1016 message is for connectivity context, service context, or connectivity and service contexts.

In an alternative implementation, the device 1002 may send such an establishment cause by setting the "cause" parameter in the RRC connection request 1016 message to "mo-Signalling" as in current systems, but by also providing a pre-defined indication (e.g., new indication) that the RRC connection request 1016 message is for establishment of a context with a connectivity serving node that can support separate connectivity (e.g. EMM) and service (e.g. ESM) contexts (e.g., an HMME), and an indication that the RRC connection request 1016 message is, for example, for "connectivity context only", "EMM only", "connectivity and service contexts", "EMM and ESM", or some other indication that signifies whether the RRC connection request 1016 message is for connectivity context, service context, or connectivity and service contexts.

The device 1002 may obtain an RRC connection setup 1018 message. The RRC connection setup 1018 message may include signaling radio bearer (SRB) information.

The device 1002 may send an RRC connection complete 1020 message to the RAN 1004. The RRC connection complete 1020 message may include dedicated NAS information (DedicatedNASInfo).

In the example of FIG. 10, the device 1002 may include one set of dedicated ESM NAS information (DedicatedESMNASInfo) in the DedicatedNASInfo, because, for example, one ESM context is being established. One set of DedicatedESMNASInfo may be included for each ESM context to be established. In other words, one tuple of DedicatedESMNASInfo may be included for each ESM context to be established. A plurality of sets or tuples are indexed herein using the letter "i", where i is an integer greater than 0.

In an aspect, the DedicatedNASInfo may include an indication associated to the DedicatedNASInfo that the request is associated with a connectivity serving node (e.g., an HMME) that can support separate connectivity (e.g. EMM) and service (e.g. ESM) contexts.

In an additional or alternative aspect, the DedicatedNASInfo may include an indication that the RRC connection request 1016 message is, for example, for "service context only" or "ESM only", or some other indication that signifies that the RRC connection request 1016 message is for a service context (e.g., ESM context) (where, for example, a connectivity context is already established).

An ESM NAS request (e.g., a PDN connection request, a service connection request) corresponding to a service context (e.g., the ESM context) being established between the device 1002 and an SME (e.g., the first SME 1008) may be included in the DedicatedNASInfo. The ESM NAS request may be referred to herein as a NAS request. The device identity may also be included in the DedicatedNasInfo. The device identity may be an SCSI (or a T-SCSI previously allocated to the device 1002 by an SME). The SCSI may be, for example, an IMSI or a P-TMSI or S-TMSI allocated, for example, in case of SIM/USIM based authentication methods.

The device 1002 may also provide, in the DedicatedESM-NASInfo in association with the DedicatedNASInfo, a GUTSI that may have been allocated to the device or a logical context of the device.

The device 1002 may also provide, in the DedicatedESM-NASInfo in association with the DedicatedNASInfo, the SCSI, or T-SCSI in order to enable the connectivity serving node 1006 to select or reselect an SME for the device 1002 based on, for example, the SCSI or T-SCSI.

The device 1002 may also provide, in the DedicatedESM-NASInfo in association with the DedicatedNASInfo, a DedicatedESMNASPayload that may include, for example, a PDN connectivity establishment request message or a PDN connection request (e.g., an ESM message).

The device 1002 may also provide, in the DedicatedESM-NASInfo in association with the DedicatedNASInfo, an indication of service type in order to identify the type of service or type of connectivity that the device 1002 is attempting to establish, in order to enable the connectivity serving node 1006 to select or reselect an SME for the device 1002.

The device 1002 may also provide, in the DedicatedESM-NASInfo in association with the DedicatedNASInfo, a PLMN selected when the EMM context with the connectivity serving node 1006 was established.

The device 1002 may also provide, in the DedicatedESM-NASInfo in association with the with the DedicatedNASInfo, one or more identifiers of the radio access points the device 1002 is connected to (including, for example, an eNB identifier, a cell identifier, a Wi-Fi AP identifier, etc.).

The device 1002 may also provide, in the DedicatedESM-NASInfo in association with the with the DedicatedNASInfo, an indication of the Access Point Name (APN) and/or a Service Anchor Point Identifier (SAPI) used by the device 1002 to identify the network or service for which the service context establishments are being requested.

Upon obtaining the RRC connection complete 1020 message, the RAN 1004 may retrieve the connectivity serving node 1006 corresponding to the C-RNTI and may send the DedicatedNASInfo to the connectivity serving node 1006. The DedicatedNASInfo includes the DedicatedESMNASInfo. The DedicatedESMNASInfo can be a container carrying the NAS request, as understood by the RAN 1004, the connectivity serving node 1006, the first SME 1008, and the second SME 1010.

The RAN 1004 may send the DedicatedNASInfo including the DedicatedESMNASInfo over an S1-AP 1022 message to the connectivity serving node 1006. The S1-AP 1022 message may include a NAS Request and may also include the device type (e.g., received from the device 1002) and/or the device identity. In an aspect, the RAN 1004 may use an eNB-UE-S1APID to identify the device with the connectivity serving node 1006 (e.g., HMME).

The RAN 1004 may include an indication (provided, for example, in addition to the NAS signaling in a new or modified information element (IE) in the RRC connection complete 1020 message) that the NAS signaling corresponds to a different service context/device identity with respect to an existing service context between the device 1002 and the connectivity serving node 1006 (for example, where the connectivity serving node supports multiple concurrent service contexts shared with a single connectivity context).

A NAS procedure 1024 may take place. The NAS procedure 1024 may include authentication or re-authentication of the EMM context of the device 1002 (e.g., EMM authentication/EMM re-authentication).

In one example, the NAS procedure 1024 may include skipping the authentication and authorization, wherein the connectivity serving node 1006 may store an indication that authentication and authorization was skipped. Additionally or alternatively, the connectivity serving node 1006 may store an indication that only service connections specific to one or more of service types, device types, PLMNs, and identifiers of radio access points the device 1002 is connected to are allowed according to a profile (e.g., subscription profile) of the device 1002 and/or according to a local connectivity serving node configuration. In an aspect, the profile (e.g., subscription profile) of the device 1002 may be obtained, for example, from a network AAA server.

The NAS procedure 1024 may include allocation of a new GUTSI (Globally Unique Temporary Service Identity). In one example, the connectivity serving node 1006 may re-authenticate the device 1002 and may assign a new GUTSIAC.

The connectivity serving node 1006, for each set of DedicatedESMNASInfo information in DedicatedNASInfo, may verify whether the service type provided by the device 1002 in association with the ESM NAS Request is allowed. The verification may be based, for example, on one or more of the device subscription profile, the device type stored in the EMM context, an optional stored indication that only a specific service connection is allowed because authentication was skipped, the APN, the SAPI, and local policy/configuration. If the service type is not allowed, the connectivity serving node 1006 may reject the establishment and provide a rejection cause. The rejection cause may indicate, for example, that the service type is not allowed for the identified device type and/or the service type is not allowed for an unauthenticated device.

In an aspect, if the service connection request is allowed, the connectivity serving node 1006 may, for example, select an SME. It will be understood that references made herein to an SME apply to an SME physical node and/or an SME logical node. Accordingly, selecting an SME encompasses selecting an SME physical node and/or an SME logical node. The selection may be performed based on, for example, one or more of the GUTSI, SCSI or T-SCSI, service type, and local configuration. The selection may be additionally or alternatively be performed based on, for example, one or more of the PLMN, the APN, and the SAPI, provided by the device 1002 to select the SME. The connectivity serving node 1006 may also use the one or more identifiers of the radio access points the device 1002 is connected to (including, for example, an eNB identifier, a cell identifier, a Wi-Fi AP identifier, etc.) in the selection process in order to determine a location-appropriate SME (e.g. an SME that serves a specific geographical area).

Furthermore, if the service connection request is allowed, the connectivity serving node 1006 may prepare SGW Information (SGW Info). If a single gateway is used and if the device 1002 has no existing ESM contexts in the connectivity serving node 1006, the connectivity serving node 1006 may select a SGW based on, for example, one or more of the service type, the PLMN, the one or more identifiers of the radio access points the device 1002 is connected to, the APN, and the SAPI. In an aspect, the connectivity serving node 1006 may indicate whether an SME can override the SGW selection by setting an Override Flag, and provide the Selected SGW and the Override Flag in the SGW Info.

If a single gateway is used and if the device 1002 already has existing ESM contexts, the connectivity serving node 1006 may verify if the stored Selected SGW is suitable based on, for example, one or more of the service type, the PLMN, the one or more identifiers of the radio access points the device is connected to, the APN and the SAPI. If not suitable, the connectivity serving node 1006 may select a SGW based on, for example, one or more of the service type, the PLMN, and the one or more identifiers of the radio access points the device is connected to. In an aspect, the connectivity serving node 1006 may indicate whether an SME can override the SGW selection by setting an Override Flag, and provides the Selected SGW and the Override Flag in the SGW Info. However, if suitable, the connectivity serving node 1006 may retrieve a stored Selected SGW, SGWSelectingSME (that identifies which SME selected the Selected SGW), and Override Flag, and provide the stored Selected SGW, SGWSelectingSME, and the Override Flag in the SGW Info to the SME.

If multiple gateways are used (e.g., a multiple SGW model), the connectivity serving node 1006 may select a SGW based on, for example, one or more of the service type, the PLMN, and the one or more identifiers of the radio access point points the device is connected to, and provide the Selected SGW in the SGW Info.

The connectivity serving node 1006, for each set of DedicatedESMNASInfo information in the DedicatedNASInfo, may send 1030, 1036 a NAS Request, including the corresponding NAS information (e.g., the DedicatedESMNASInfo including GUTSI, SCSI/T-SCSI, DedicatedESMNASPayload, and service type) and the SGW Info (e.g., the selected SGW, Override Flag) to the SME selected (e.g., the SME selected may be one of the first SME 1008 and the second SME 1010). In one example, the connectivity serving node 1006 may send the DedicatedESMNASInfo, including the service type, the PLMN, and one or more identifiers of the radio access points the device 1002 is connected to, as provided by the device 1002, to the selected SME. In an aspect, for example, the connectivity serving node 1006 may also send the SGW Info and a selected PGW if the connectivity serving node 1006 selected a PGW. In an implementation, the connectivity serving node 1006 may select the PGW based on, for example, the APN or SAPI.

For each SME (e.g., first SME 1008, second SME 1010) a NAS procedure may take place between the device 1002 and the SME (e.g., first SME 1008, second SME 1010), during which ESM authentication and ESM establishment may occur 1032, 1038.

In one example, each SME (e.g., first SME 1008, second SME 1010) may retrieve credentials and a device subscription profile corresponding to the SCSI or T-SCSI (e.g., by interacting with a serving AAA server corresponding to the SCSI or T-SCSI). Each SME (e.g., first SME 1008, second SME 1010) may authenticate the device 1002 based on the credentials.

Upon successful authentication or skipping the authentication, each SME 1008, 1010 may allocate 1034, 1040 a GUTSI (Globally Unique Temporary Service Identity) and/or a (new) Temporary SCSI (T-SCSI) to the device 1002. Each SME 1008, 1010 may additionally or alternatively allocate 1034, 1040 a Temporary Transport Identifier (TTI) that may be used to identify, in the connectivity serving node 1006, the relationship between an ESM context of the device 1002 and the corresponding SME 1008, 1010.

Each SME 1008, 1010 may verify that a PLMN provided by the device 1002 is authorized, based on, for example, one or more of a local configuration/policy, the device subscription profile, and a subscriber profile. If not allowed, an SME may send the device 1002 an ESM rejection that can include the cause of the rejection.

Each SME (e.g., first SME 1008, second SME 1010) may verify that the service type provided by the device 1002, if any, is authorized. Verification may be based on, for example, local configuration/policy and the device subscription profile. Verification may optionally be based on, for example, the one or more identifiers of the radio access points the device 1002 is connected to, the APN and/or the SAPI. Each SME 1008, 1010 may authenticate the device 1002 based on, for example, the SCSI or T-SCSI, based on, for example, the credentials from the device subscription profile. Authenticating the device 1002 in an SME (e.g., first SME 1008, second SME 1010) may include skipping the authentication if the SME determines that the service connection request is, for example, a service connection request for an emergency service.

In an aspect, the authentication and connectivity/service establishment messages between the device 1002 and each SME (e.g., first SME 1008, second SME 1010) may be transported as a payload in NAS messages between the device 1002 and the connectivity serving node 1006. For device 1002 to SME (e.g., first SME 1008, second SME 1010) messages, the connectivity serving node 1006 may forward the encapsulated message to the SME. For SME to device 1002 messages, the connectivity serving node 1006 may encapsulate the message in a NAS message to the device 1002.

Each SME (e.g., first SME 1008, second SME 1010) may deliver to the connectivity serving node 1006 a first message directed to the device 1002 to be encapsulated together with the GUTSI. In one example, the SME (e.g., first SME 1008, second SME 1010) may also provide the SCSI/T-SCSI. In another example, the SME (e.g., first SME 1008, second SME 1010) may provide the TTI.

When sending further messages to the SME (e.g., first SME 1008, second SME 1010), the device may encapsulate the message in a NAS message sent to the connectivity serving node 1006 by also providing the GUTSI and, if allocated, the TTI so that the connectivity serving node 1006 knows to which SME the encapsulated message should be forwarded.

For a single SGW model, each SME (e.g., first SME 1008, second SME 1010) may select a new SGW, or reselect an SGW, if the override flag is not set, based on, for example, one or more of the service type, the SCSI, the subscription associated with the SCSI, the one or more identifiers of the radio access points the device 1002 is connected to, the PLMN provided by the device 1002 (if any), local policy, etc., and return the selected SGW to the connectivity serving node 1006. Each SME (e.g., first SME 1008, second SME 1010) may also set, for example, based on, for example, one or more of the service type, the SCSI, the subscription associated with the SCSI, local policy, etc. the Override Flag so that other SMEs do not override the SGW selection.

For a multiple GW model, each SME (e.g., first SME 1008, second SME 1010) may select a new SGW, or reselect an SGW, based on, for example, one or more of the service type, the SCSI, the subscription associated with the SCSI, the one or more identifiers of the radio access points the device is connected to, the PLMN provided by the device 1002 (if any), local policy, the APN, the SAPI, etc., and return the Selected SGW to the connectivity serving node 1006.

In an aspect, if the connectivity serving node 1006 selected a PGW, the connectivity serving node 1006 may verify if the selected PGW is suitable based on, for example, one or more of the service type, the SCSI, the subscription associated with the SCSI, the one or more identifiers of the radio access points the device is connected to, the PLMN provided by the device 1002 (if any), local policy, etc., and return the selected PGW to the connectivity serving node 1006.

In an aspect, the connectivity serving node 1006, for each ESM context, may store 1042, in an EMM profile for the device 1002, parameters that may facilitate establishment and/or management of each ESM context. In one example, the connectivity serving node 1006 may store a mapping of an identifier of a first service context (e.g., an SCID1, a T-SCID1), a GUTSI (e.g., GUTSI1), and a GUTSIAC for a first ESM context. The connectivity serving node 1006 may additionally store a mapping of an identifier of a second service context (e.g., an SCID2, a T-SCID2), a GUTSI (e.g., GUTSI2), and a GUTSIAC for a second ESM context. In one example, the connectivity serving node 1006 may store, for each ESM context, the set of information received from each SME, which may include: for a single SGW model, if the SME selected a new SGW, the Selected SGW, SGWSelectingSME, and Override Flag; and for a multiple SGW model, the SGW selected by the SME or, if the SME did not select an SGW, the connectivity serving node 1006 may store the SGW selected by the connectivity serving node 1006.

In an aspect, the connectivity serving node 1006 may correlate the ESM contexts using the stored mapping between the various GUTSIis and the GUTSIAC. In an example, the connectivity serving node 1006 may correlate the two ESM contexts described in connection with FIG. 10 for GUTSI1 and GUTSI2 via GUTSIAC. In an example, the connectivity serving node 1006 may correlate the two ESM contexts described in connection with FIG. 10 using the identifiers of the SMEs associated with the first and second service contexts (e.g., the SCID1, the T-SCID1, the SCID2, the T-SCID2), the GUTSIAC, and/or the GUTSI1, GUTSI2 associated with the respective ESM contexts. Optionally, the connectivity serving node 1006 may correlate each ESM context using the received SCSI/T-SCSI or TTI in relation to GUTSI1 and GUTSI2, as allocated by the connectivity serving node 1006 upon EMM authentication or re-authentication.

The connectivity serving node 1006 may also store the selected PGW for each ESM context. If the connectivity serving node 1006 selected a PGW, the connectivity serving node 1006 may verify if the selected PGW is suitable based on, for example, one or more of the service type, the SCSI, the subscription associated with the SCSI, the one or more identifiers of the radio access point or access points the device is connected to, the PLMN provided by the device (if any), local policy, etc., and return the selected PGW to the connectivity serving node 1006.

An SME (e.g., first SME 1008, second SME 1010) may request the connectivity serving node 1006 to allocate one or more radio access bearers (RABs) for the service connections.

The connectivity serving node 1006 may provide to the RAN 1004 a request for the allocation of one or more RABs, the Selected SGW, and the selected PGW. The RAN 1004 may establish, for each ESM context, the RABs and store the corresponding selected SGW.

Radio Link Establishment Process when Device is in Connected Mode

If a device (e.g., chip component, client device) is in connected mode, i.e. there is already an active RRC connection between the device and the eNB, upon establishment of one or more service connections with a first one or more SMEs, the process of sending a random access preamble 912, 1012, obtaining a random access response 914, 1014, sending an RRC connection request 916, 1016, obtaining an RRC connection setup 918, 1018, and sending an RRC connection complete 920, 1020 of the previous procedures for ESM establishment reflected in FIGS. 9 and 10 may be replaced by the device 902, 1002 sending the information described in the following paragraphs.

The device may include, in the DedicatedNASInfo, multiple sets of DedicatedESMNASInfo information, one for each ESM context to be established.

A request (e.g., service connection request, an ESM NAS request, a PDN connection request) corresponding to the service context (e.g., the ESM context) being established between the device and an SME, may be included in a DedicatedNASInfo. The device identity in the request may be an SCSI (or a T-SCSI previously allocated to the device 902 by an SME (e.g., the first SME 908)). The SCSI may be, for example, an IMSI or a P-TMSI or an T-TMSI allocated, for example, in case of SIM/USIM based authentication methods.

The DedicatedNASInfo may include the same information as in an Evolved Universal Terrestrial Radio Access Network (EUTRAN) for an ESM context (e.g., a PDN connection request message), but in addition, the DedicatedNASInfo may include one or more of device type, service type, and one or more identifiers of the radio access points the device is connected to (including a eNB identifier, a cell identifier, a Wi-Fi AP identifier, etc.). The DedicatedNASInfo may also include an Access Point Name (APN) and/or a Service Anchor Point Identifier (SAPI) that may be used by the device to identify the network or service for which the service context establishment is being requested.

The device may provide, in association with the ESM NAS Request, the SCSI or T-SCSI to enable the connectivity serving node to select or reselect an SME for the device based on, for example, the SCSI or T-SCSI.

The device may provide, in the DedicatedESMNASInfo associated with the DedicatedNASInfo, one or more of a device type that indicates to the network the type of device behavior for this device (e.g., the device could be M2M, multimedia, etc.) and can be used by the eNB and the connectivity serving node to differentiate the treatment of the device (e.g., for mobility management, security, etc.), a service type indication, the selected PLMN, and one or more identifiers of the radio access points the device is connected to (including, for example, an eNB identifier, a cell identifier, a Wi-Fi AP identifier, etc.).

The device may also add to the DedicatedESMNASInfo an indication associated with the DedicatedNASInfo of the Access Point Name (APN) and/or a Service Anchor Point Identifier (SAPI) used by the device to identify the network or service for which the service context establishment is being requested.

The device can send such information either in an existing RRC message or in a new RRC Transparent Transport message. If in an existing RRC message, the existing RRC message (e.g. RRC connection re-establishment, etc.) may be modified to encapsulate the information and may contain an indication that the message is carrying further context establishment information. If in the new RRC Transparent Transport message, the new RRC Transparent Transport message may encapsulate the information. An uplink and a downlink version of the new RRC Transparent Transport message are contemplated.

Upon receiving such information, the connectivity serving node and the SME behave as indicated in FIG. 9 and FIG. 10.

Alternative SME Selection Procedure

In the procedures illustrated in FIGS. 8, 9, and 10, the SME may be selected by the connectivity serving node. An alternative solution can be based on, for example, the SME being selected by the RAN (e.g., eNB) for each ESM context (e.g., service context) being established for a set of credentials and a device identifier different from one used by the device to establish an EMM context (e.g., connectivity context) with the connectivity serving node.

The selection of the SME by the RAN (e.g., eNB) may be performed based on, for example, information provided by the device during the RRC procedure, enhanced with the use of one or more of a device type, a service type provided for each ESM context (e.g., service context) being established, the selected PLMN, and one or more identifiers of the radio access points the device is connected to (including a eNB identifier, a cell identifier, a Wi-Fi AP identifier, etc.), the APN, and the SAPI. However, once the RAN has selected the SME, in an aspect, the RAN may not forward the NAS signaling provided by the device for each ESM context in an RRC connection complete 920, 1020 message as in FIGS. 9 and 10 to the SME, but instead may forward the NAS signaling from the device to the connectivity serving node encapsulating it over S1-AP as defined for the procedures in FIGS. 8, 9 and 10, and may provide the connectivity serving node the identity of the selected SME for each ESM context being established by the device.

Upon obtaining the S1-AP 922, 1022 message of FIGS. 9 and 10, the encapsulated NAS signaling and the identity of the selected SME for each ESM context being established, the connectivity serving node may store, for the device, the selected SME, and the identity associated to the device for the device-SME context (e.g., either a permanent identity or a temporary identity that the connectivity serving node may allocate to the device during the NAS procedure). Note that during the NAS procedure, the NAS signaling exchanged between the device and the SME may be protected and encrypted, thus in order to enable the connectivity serving node 906, 1006 to route future device-to-SME or SME-to-device NAS messages appropriately, the SME may provide to the connectivity serving node 906, 1006 a temporary identifier allocated by the SME to the device 902, 1002 during the NAS procedure (e.g. authentication or context establishment between the device and the connectivity serving node). Examples of temporary identifiers that an SME may allocate 934, 1034, 1040 to the device 902, 1002 include a GUTSI, a T-SCSI, and/or a TTI. When sending NAS signaling to the connectivity serving node, the device may provide, in the NAS signaling, such an identifier to enable the connectivity serving node to route the NAS signaling appropriately.

The SME may request the connectivity serving node to allocate one or more radio access bearers (RABs) for the service connection. The connectivity serving node for each ESM context stored may provide to the RAN the request for the allocation of one or more RABs and the Selected SGW. The RAN may establish, for each ESM context, the RABs and may store the corresponding Selected SGW.

In this aspect, the RAN (e.g., eNB) may be aware not only of the selected connectivity serving node and the existence of an EMM context between the device and the connectivity serving node, but also of all the ESM contexts that the device has with SMEs.

Device Rejected by the Network

Aspects described herein may addresses a rejection case due to a device being rejected by a network.

Rejection of the device by the network (e.g. a PLMN) may happen for a context being established. Some examples of contexts that may be established include an EMM-only context with a connectivity serving node (e.g., an HMME), an EMM and ESM context with a connectivity serving node, an ESM context with an SME after an EMM context for the same PLMN was established successfully with a connectivity serving node, and a context with an MME.

The device behavior when receiving a rejection with a cause indicating the device is being rejected because of the chosen PLMN, can be determined based on, for example, whether the rejection is an EMM rejection or an ESM rejection.

In case of EMM rejection, behavior may be determined based on, for example, distinguishing between whether the rejection is at the Tracking Area Identity (TAI) level, or PLMN level, and whether the rejection is of a temporary nature or permanent. Depending on the cause of the rejection, the device might wait for a timer to expire, wait until the device moves to a different area, try another RAT in the same PLMN, or try another PLMN.

In case of ESM rejection, the device does not select another PLMN (no service-based PLMN selection). The device, for example, either waits for a timer to expire (e.g., if the network provided a backoff timer) then retries the request, tries another RAT, or gives up on the request.

In aspects described herein, if the device obtains an EMM rejection from the connectivity serving node upon requesting the establishment of a connectivity context based on, for example, a connectivity context shared with one or more service contexts due to the selected PLMN, then the device may, for example, either wait for a timer to expire (e.g., if the network provided a backoff timer) then retry the request, try another RAT, or give up on the request. If the device gets an ESM rejection for the request to establish a service connection based on, for example, a service context due to the selected PLMN and optionally one or more of service type, device type, one or more identifiers of the radio access point or access points the device is connected to, the APN, and the SAPI, by either a connectivity serving node (e.g., an HMME), or an SME, then the device may, for example, either wait for a timer to expire (e.g., if the network provided a backoff timer) then retry the request, try another RAT, or give up on the request.

If authenticating at a connectivity serving node a request to establish a connectivity context based on, for example, a first context includes skipping the authentication at the connectivity serving node, and allowing the device to establish, for example, service connections specific to one or more of a service type, device type, and selected PLMN provided by the device in the request according to the device subscription profile (obtained via a network AAA server) or local connectivity serving node configurations, then upon receiving a request for the establishment of a service connection based on, for example, a service context (e.g., an ESM context) and corresponding to one or more of a service type, device type, and selected PLMN, the connectivity serving node may reject the request and provide a rejection cause. In one example, rejecting the request includes providing a rejection cause indicating, for example, that the service is not allowed due to an unauthenticated connectivity context (e.g., wherein the connectivity context may be shared by one or more service contexts), wherein the rejection cause may contain one or more of a service type, a device type, and a selected PLMN.

Exemplary Device

Figure 11:
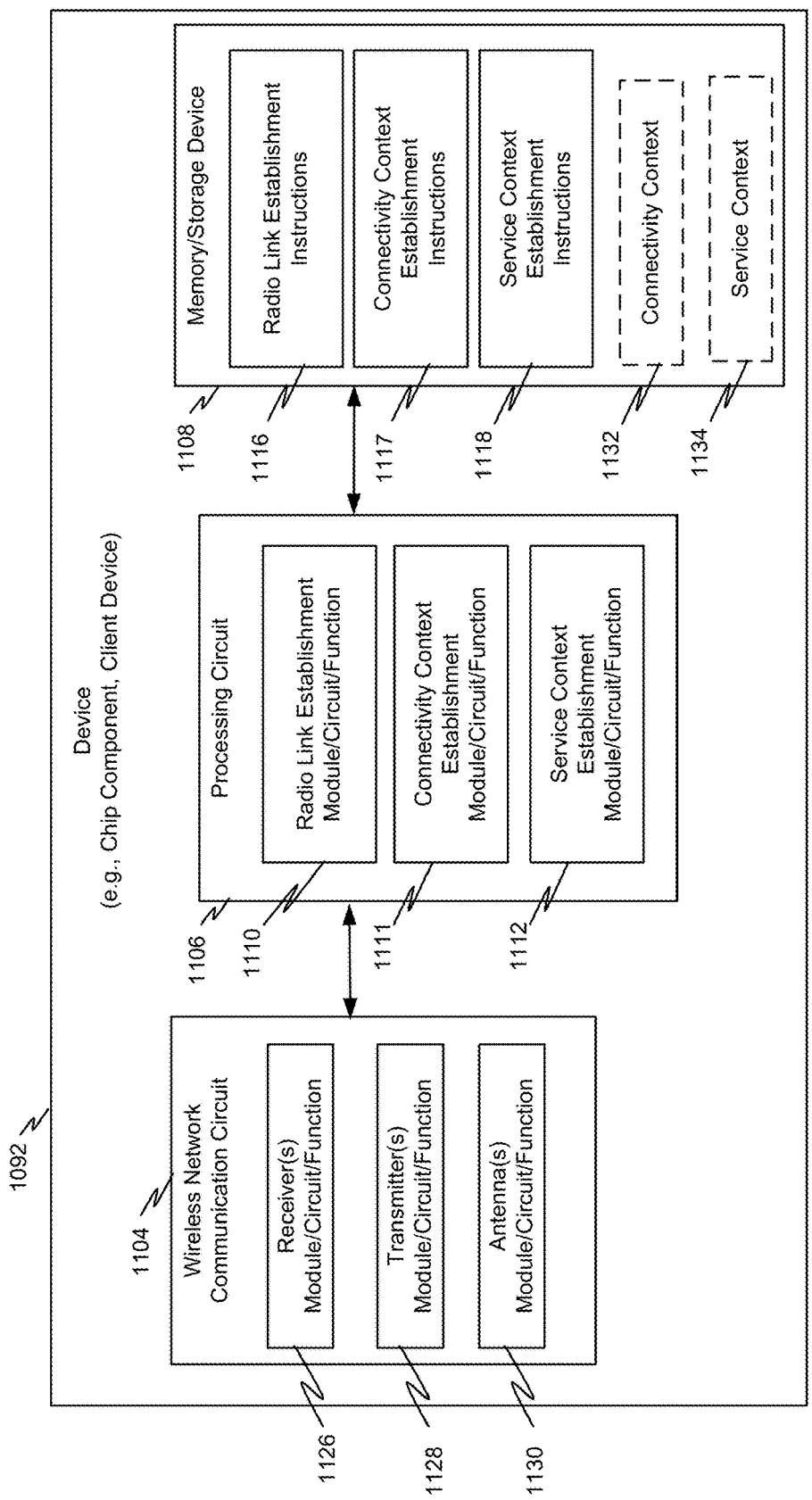
FIG. 11 illustrates an exemplary device configured to use a single radio link to support a connectivity context shared by multiple concurrent service contexts.

FIG. 11 illustrates an exemplary device 1102 configured to use a single radio link to support a connectivity context shared by multiple concurrent service contexts. The exemplary device 1102 may be a wireless device. The exemplary device 1102 may include a wireless network communication circuit 1104, a processing circuit 1106, and a memory/storage device 1108 that may be operationally coupled to one another.

The wireless network communication circuit 1104, may serve to couple the exemplary device 1102 to one or more networks via one or more radio access networks using one or more wireless access technologies that facilitate establishing a wireless link to other devices/networks/services. Accordingly, the wireless network communication circuit 1104 may be configured to facilitate wireless communications of the exemplary device 1102. In one aspect, the wireless network communication circuit may be configured to communicate over a wireless network. The wireless network communication circuit 1104 may include one or more receiver module/circuit/functions 1126, one or more transmitter module/circuit/functions 1128, and/or one or more antenna module/circuit/functions 1130. The receiver module/circuit/functions 1126, transmitter module/circuit/functions 1128, and/or antenna module/circuit/functions 1130 may be operationally coupled to one another. The one or more antenna module/circuit/functions 1130 may facilitate wireless communication with the one or more wireless devices, networks, and/or services.

The processing circuit 1106 may be operationally coupled to the wireless network communication circuit 1104. The processing circuit 1106 may include a radio link establishment module/circuit/function 1110, a connectivity context establishment module/circuit/function 1111, and a service context establishment module/circuit/function 1112.

The processing circuit 1106 may be adapted for processing, including the execution of programming, which may be stored on the memory/storage device 1108. The memory/storage device 1108 may include radio link establishment instructions 1116, connectivity context establishment instructions 1117, and service context establishment instructions 1118. Optionally, the memory/storage device 1108 may also store a connectivity context 1132 and one or more service contexts 1134.

The device may implement one or more of the processes illustrated in FIGS. 1-10. In an aspect, the exemplary device 1102 may implement one or more of the processes recited in FIG. 12.

Figure 12:
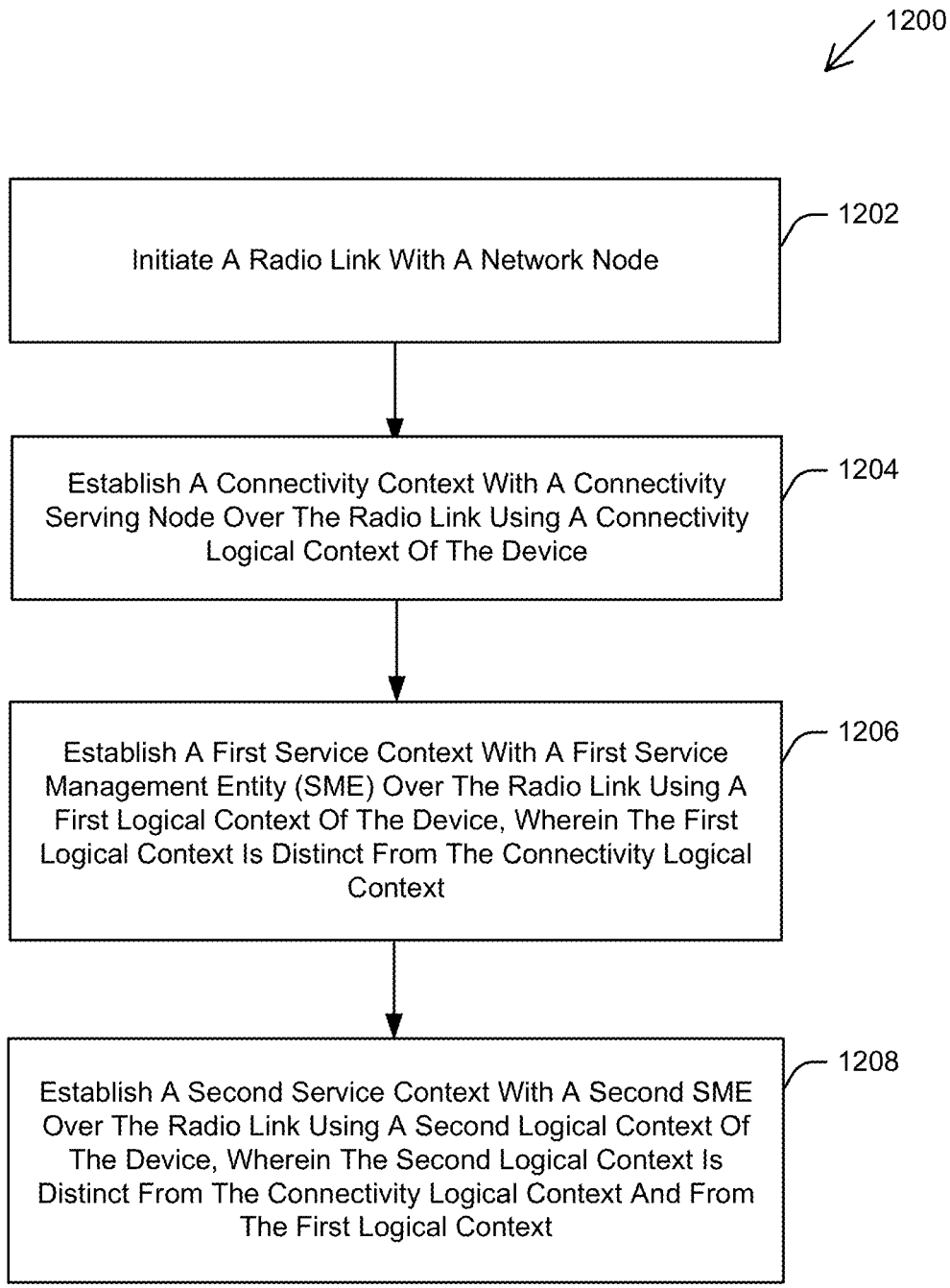
FIG. 12 illustrates an exemplary method, operational at a device in accordance with aspects described herein.

FIG. 12 illustrates an exemplary method, operational at a device in accordance with aspects described herein. The device may initiate 1202 a radio link with a network node (e.g., a RAN or an eNB of the RAN). The device may establish 1204 a connectivity context with a connectivity serving node (e.g., an HMME) over the radio link using a connectivity logical context of the device (e.g., a logical context of the device that can be used to establish and/or maintain a connectivity context of the device, a device context). The device may establish 1206 a first service context with a first service management entity (SME) over the radio link using a first logical context of the device, wherein the first logical context is distinct from the connectivity logical context. Additional service contexts may also be established; accordingly, in an aspect, the device may further establish 1208 a second service context with a second SME over the radio link using a second logical context of the device, wherein the second logical context is distinct from the connectivity logical context and from the first logical context.

In an aspect, for example, the connectivity logical context and the first logical context can be distinct contexts. Although the connectivity logical context and the first logical context can be distinct contexts, they may belong to the same device. In one aspect, the connectivity logical context and the first logical context may be distinct contexts because they may have distinct credentials. In one aspect, the credentials may be retrieved from different AAA servers.

In one aspect, the connectivity logical context and the first logical context can be maintained separately (e.g., maintained separately at the same device) and can be distinct contexts.

In another aspect, for example, the connectivity logical context and the first logical context can be the same context, but can still be maintained separately. For example, there may be two copies of the same context, one for a connectivity context (e.g., an EMM context) and one for a service context (e.g., an ESM context). The two copies may have the same credentials and may belong to the same device. The credentials may be retrieved from the same AAA server. However, in the aspect, the connectivity logical context and the first logical context are two separate copies that can be used at the connectivity serving node and an SME, respectively. In this aspect, the connectivity logical context and the first logical context can be maintained separately (e.g., maintained separately at the same device) and can be the same context.

In one aspect, the connectivity context that may be shared with one or more service contexts can be established based on a set of credentials associated with the connectivity logical context of the device. The set of credentials associated with the connectivity logical context of the device can be stored in a home AAA server.

In one aspect, the first service context can be established based on a set of credentials associated with the first logical context of the device. The set of credentials associated with the first logical context of the device can be stored in a service AAA server. In an implementation, the home AAA server and the service AAA server can be distinct AAA servers.

In an aspect, the connectivity context can be limited to mobility management and signaling security for the device.

In an aspect, for example, the connectivity serving node supports distinct connectivity and service contexts.

In an implementation, the first service context and the second service context can be connected, idled, and/or disconnected independent of each other. In an example, the second SME can be distinct from the first SME. In an aspect, the radio link can be a radio resource control or media access control layer radio link of a communication protocol stack.

The device may optionally provide one or more of a service type indication, device type indication, selected PLMN indication, and one or more identifiers of the radio access points the device is connected to (e.g. eNB identifier, cell identifier, Wi-Fi access point identifier, etc.). In various examples, the connectivity serving node may operate as an access node, within a RAN, and/or within a core network. The device may send a radio link establishment request using the first context or credentials associated with the first context. A connectivity context that may be shared with one or more service contexts may be established with the connectivity serving node using a connectivity logical context (e.g., a logical context of the device, instantiated at the device, used to establish and/or maintain the connectivity context). Such a connectivity context may be authenticated by the connectivity serving node, with credentials obtained from a network AAA server (e.g., a home AAA server) prior to establishing the radio link.

A first service connection may be established via the radio link using a first service context, wherein the device provides to the network a service connection establishment request including information associated with, for example, the first service context (e.g. an identifier corresponding to the first service context such as an SCSI, and one or more of a service type indication, a device type indication, a selected PLMN indication, and one or more identifiers of the radio access points the device is connected to), and wherein the first service connection is established with a first service management entity (SME) 1206. For instance, the device may send a service connection establishment request for a service connection based on the first service context or service credentials associated with the first service context. Such first service context can be authenticated by the SME prior to establishing the service connection.

In various examples, the connectivity context may be based on, for example, a first set of credentials associated with the connectivity logical context of the device. In various examples, the connectivity context may be limited to mobility management and signaling security for the device.

In various examples, the SME and connectivity serving node may be distinct from each other. In various examples, the SME may be hosted by the connectivity serving node.

The device may also establish a second service connection, using a second service context, via the radio link, wherein the second service connection can be established with a second service management entity (SME). The first service context and the second service context may be connected, idled, and/or disconnected independent of each other. In various examples, the second SME may be the same as the first SME, or the second SME may be distinct from the first SME.

The first service connection may be uniquely identified using a subscription identifier distinct from other subscription identifiers used by other service connections established by the device. In one example, the first service context may correspond to a set of subscriber credentials distinct from the credentials that correspond to the connectivity context. In one example, the first service context and the connectivity context may be associated with distinct subscriber credentials.

In various examples, the radio link may be a radio resource control or media access control layer radio link of a communication protocol stack. Signaling traffic associated with the connectivity context and one or more service connections, sharing the connectivity context, for the device may be multiplexed concurrently over the radio link.

The method may further include transmitting signaling traffic from the device via one or more of the connectivity context and one or more service connections shared with the connectivity context over the radio link. Likewise, the method may also include receiving signaling traffic from the first serving node via one or more of the connectivity context and the one or more service connections shared with the connectivity context over the radio link.

Exemplary Connectivity Serving Node/Device

Figure 13:
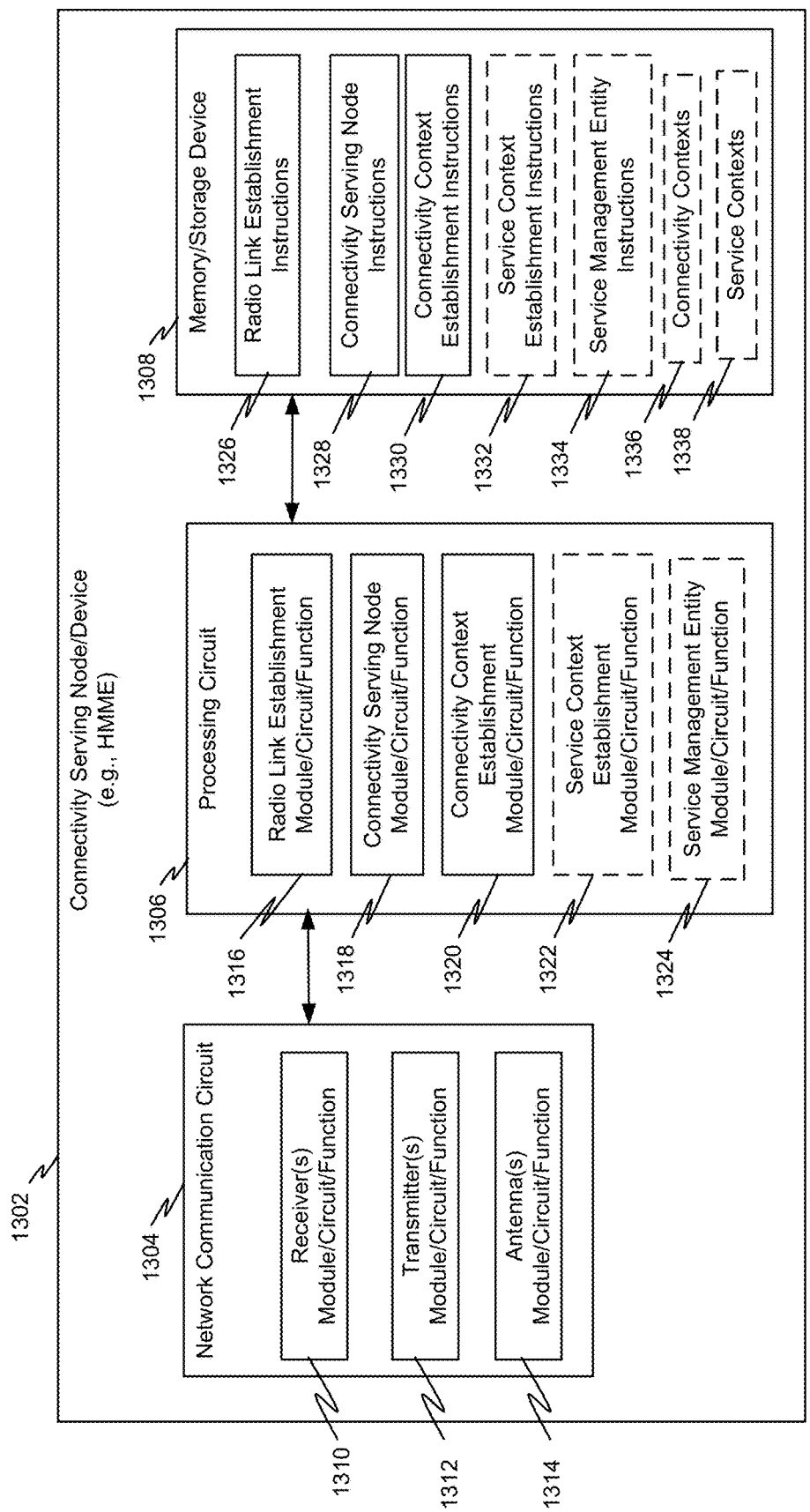
FIG. 13 illustrates an exemplary connectivity serving node/device configured to support distinct connectivity and service contexts associated with a device in accordance with aspects described herein.

FIG. 13 illustrates an exemplary connectivity serving node/device (e.g., HMME) configured to support distinct connectivity and service contexts associated with a device in accordance with aspects described herein. The exemplary connectivity serving node/device may be referred to herein as the connectivity serving node 1302. The connectivity serving node 1302 may support a device operating on a single radio link by supporting concurrent operation of a connectivity context and multiple service contexts of the device that share the connectivity context.

The connectivity serving node 1302 (e.g., HMME) may include one or more of a network communication circuit 1304, a processing circuit 1306, and a memory/storage device 1308 that may be operationally coupled to one another.

The network communication circuit 1304, may serve to couple the connectivity serving node 1302 to one or more wireless networks (e.g., wireless networks) and devices (e.g., chip components, client devices) using one or more wired or wireless access technologies that facilitate establishing links between devices and network access nodes. In an aspect, the network communication circuit 1304 may be for communicating with devices over a wireless network. The network communication circuit 1304 may include at least one receiver module/circuit/function 1310 and/or at least one transmitter module/circuit/function 1312. The network communication circuit 1304 may also include one or more antenna modules/circuits/functions 1314 (or other input/output modules/circuits/functions) operationally coupled to the at least one receiver module/circuit/function 1310 and/or at least one transmitter module/circuit/function 1312.

The processing circuit 1306 may be operationally coupled to the network communication circuit 1304. The processing circuit 1306 may include, for example, a radio link establishment module/circuit/function 1316, a connectivity serving node module/circuit/function 1318, and a connectivity context establishment module/circuit/function 1320. Additionally, in some implementations, the processing circuit 1306 may optionally include a service context establishment module/circuit/function 1322. Additionally or alternatively, the processing circuit 1306 may optionally include a service management entity module/circuit/function 1324.

The processing circuit 1306 may be adapted for processing, including the execution of instructions, which may be stored on the memory/storage device 1308. As used herein, the term "instructions" may be construed broadly to include without limitation instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The memory/storage device 1308 may be operationally coupled to the processing circuit 1306 and may also may be operationally coupled to the network communication circuit 1304. The memory/storage device 1308 may include radio link establishment instructions 1326, connectivity serving node instructions 1328, and connectivity context establishment instructions 1330.

Additionally, in some implementations, the memory/storage device 1308 may optionally include service context establishment instructions 1332. Additionally or alternatively, the processing circuit 1306 may optionally include service management entity instructions 1334.

Optionally, the memory/storage device 1308 may store connectivity contexts 1336 (or credentials) and/or service contexts 1338 (or credentials).

The connectivity serving node 1302 may implement one or more of the processes illustrated in FIGS. 1-10. In one example, the connectivity serving node 1302 may implement one or more of the processes recited in FIG. 14.

Figure 14:
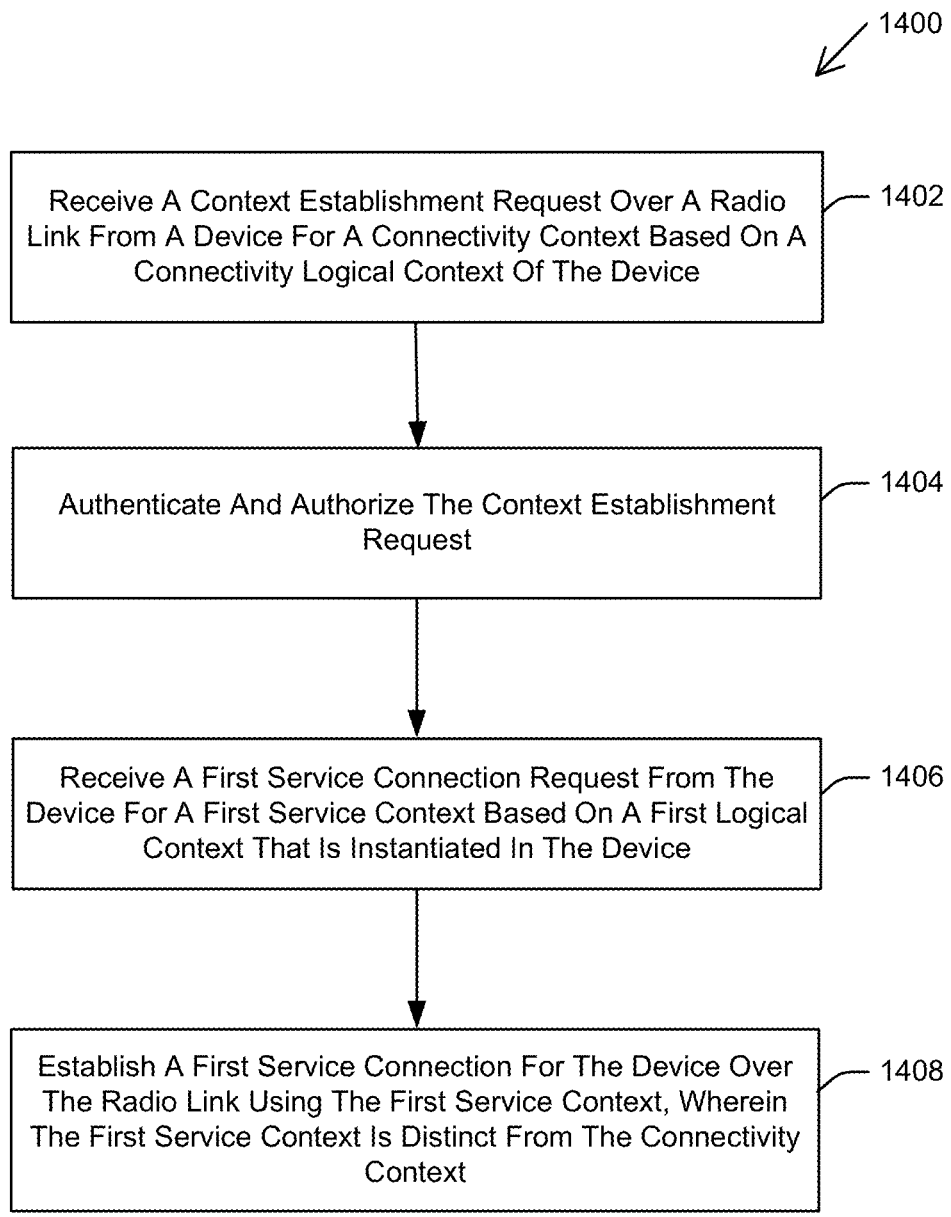
FIG. 14 illustrates an exemplary method, operational at a connectivity serving node in accordance with aspects described herein.

FIG. 14 illustrates an exemplary method, operational at a connectivity serving node in accordance with aspects described herein. In an aspect, the method may include receiving a context establishment request from a device for a connectivity context based on a connectivity logical context of the device 1402. The method may also include authenticating and authorizing the context establishment request 1404. The method may then include receiving a first service connection request from the device for a first service context based on a first logical context that is instantiated in the device 1406. The method may further include, establishing a first service connection for the device over the radio link using the first service context, wherein the first service context is distinct from the connectivity context 1408.

The method may further include establishing the radio link associated with the connectivity context, with the device, if the context establishment request is successfully authenticated and authorized.

The method may further include selecting or reselecting a first service management entity (SME) based on an identity of the first logical context, and sending a first service connection request to the first SME. In an aspect, the connectivity serving node can be distinct from the first SME. In an aspect, the first SME can be a logical node hosted by the connectivity serving node. In an example, the method can further include sending signaling traffic between the device and the first SME through the first service connection over the radio link, wherein the first service connection is one of a plurality of distinct service connections associated with the connectivity context.

In an aspect, the method can further include receiving a second service connection request from the device for a second service context based on a second logical context of the device that is instantiated in the device; and establishing a second service connection for the device over the radio link using the second service context, wherein the first service context, the second service context, and the connectivity context are distinct contexts. Establishing the second service connection can include selecting or reselecting a second SME based on an identity of the second logical context; and sending a second service connection request to the second SME. In an aspect, first SME can be distinct from the second SME. In an aspect, the connectivity context can be limited to mobility management and signaling security for the device. In an aspect, the connectivity context may include one or more distinct service contexts for the device.

In an aspect, the radio link can be a radio resource control (RRC) layer or a media access control (MAC) layer of a communication protocol stack. In an aspect, establishing the first service connection may include authorizing the first service connection request based on the first logical context associated with (e.g., mapped to) the connectivity context. Establishing the first service connection may include authorizing the first service connection request based on one or more of a network identifier, a service identifier, and a device type.

In an implementation, a context establishment request may be received from a device for a connectivity context based on, for example, a connectivity logical context (e.g., a logical context of the device, instantiated at the device, used to establish and/or maintain the connectivity context). The connectivity context may be shared by one or more service contexts. The context establishment request may be authenticated and authorized. A radio link, associated with the connectivity context, may be established with the device. Subsequently, one or more service connection requests may be received for the device associated with one or more device logical contexts (e.g., a device logical context may be a logical context of the device, instantiated at the device, used to establish and/or maintain a service context of the device, a device service context). One or more service connections may then be established for the device over the radio link.

In one example, a connectivity serving node (e.g., HMME) may be implemented at the serving node that authenticates and authorizes the connectivity context. The connectivity context may be limited to mobility management and signaling security for the device. In some examples, the connectivity context includes one or more service contexts for the device. In one example, the radio link may be established if the connectivity context is successfully authenticated and authorized by the connectivity serving node. The radio link may be a radio resource control (RRC) layer or a media access control (MAC) layer of a communication protocol stack.

In one implementation, establishing a service connection for the device can include selecting a first service management entity (SME) and sending the one or more service connection requests to the first service management entity.

Signaling traffic may be sent between the device and the SME through one or more distinct service connections over the radio link. Sending signaling traffic between the device and the SME through one or more distinct service connections over the radio link may include mapping identifiers associated to the signaling traffic of a service connection to the corresponding device and SME.

Establishing a service connection for a device may include authorizing the service connection request based on, for example, the first device context associated with the connectivity context. The connectivity context may be shared by one or more service contexts. Authorizing the service connection may include authorizing based on, for example, one or more of a network identifier, a service identifier, and a device type.

In one example, a first service connection request may be sent to a first SME and a second service connection request is sent to a second SME.

Exemplary Service Management Entity Node/Device

Figure 15:
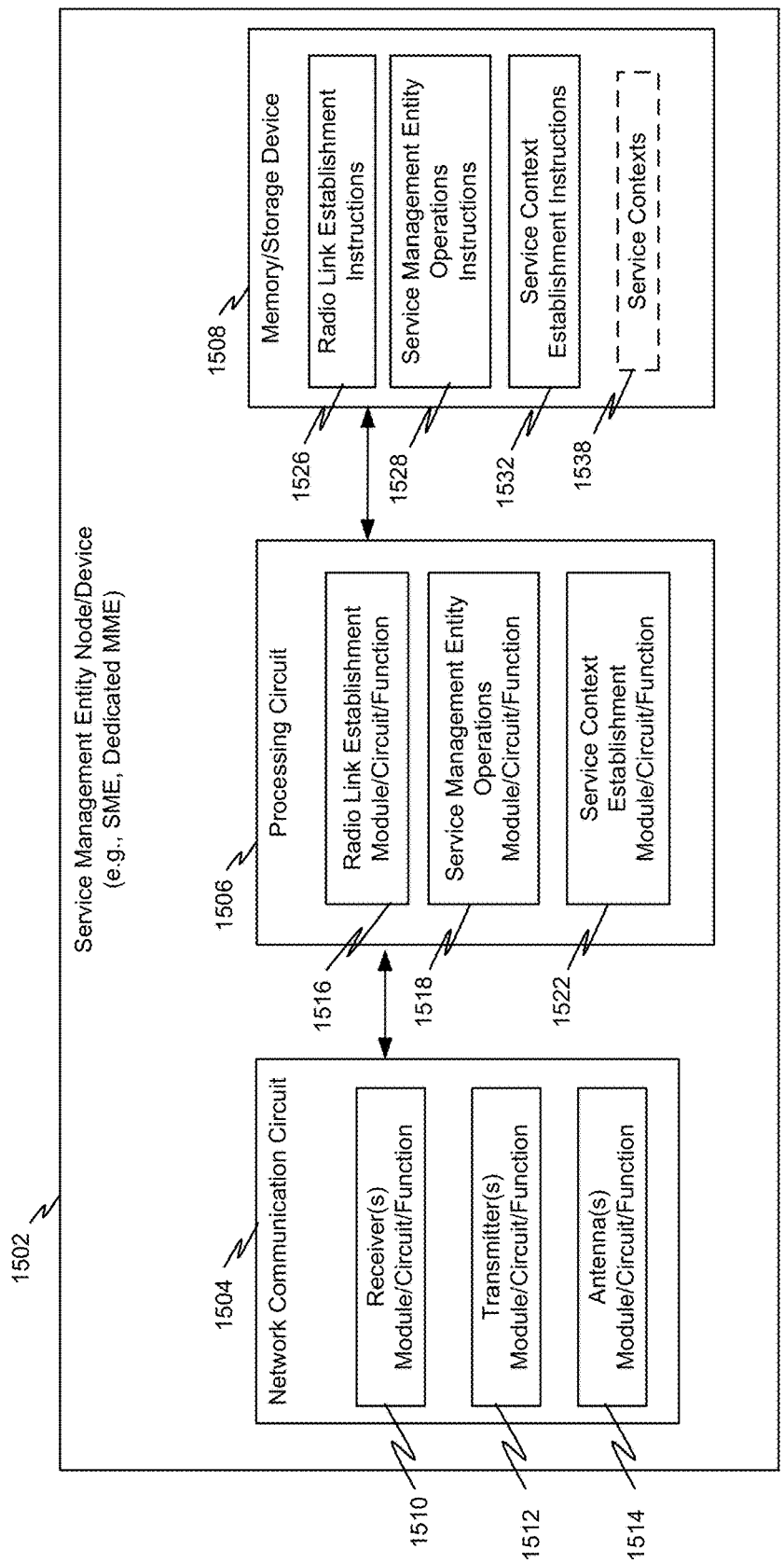
FIG. 15 illustrates an exemplary service management entity node/device configured to support service connections with a connectivity serving node, where the connectivity serving node supports distinct connectivity and service contexts associated with a device in accordance with aspects described herein.

FIG. 15 illustrates an exemplary service management entity node/device (e.g., an SME, a dedicated MME) configured to support service connections with a connectivity serving node, where the connectivity serving node supports distinct connectivity and service contexts associated with a device in accordance with aspects described herein. The exemplary service management entity node/device may be referred to herein as a service management entity (SME) 1502.

The SME 1502 may include one or more of a network communication circuit 1504, a processing circuit 1506, and a memory/storage device 1508 that may be operationally coupled to one another.

The network communication circuit 1504, may serve to couple the SME 1502 to one or more wireless networks and devices (e.g., chip components, client devices) using one or more wired or wireless access technologies that facilitate establishing links between devices and the wireless networks. In an aspect, the network communication circuit 1504 may be for communicating with devices over a wireless network. The network communication circuit 1504 may include at least one receiver module/circuit/function 1510 and/or at least one transmitter module/circuit/function 1512. The network communication circuit 1504 may also include one or more antenna modules/circuits/functions 1514 (or other input/output modules/circuits/functions) operationally coupled to the at least one receiver module/circuit/function 1510 and/or at least one transmitter module/circuit/function 1512.

The processing circuit 1506 may be operationally coupled to the network communication circuit 1504. The processing circuit 1506 may include, for example, a radio link establishment module/circuit/function 1516, a service management entity operations module/circuit/function 1518, and a service context establishment module/circuit/function 1522.

The processing circuit 1506 may be adapted for processing, including the execution of instructions, which may be stored on the memory/storage device 1508. As used herein, the term "instructions" may be construed broadly to include without limitation instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The memory/storage device 1508 may be operationally coupled to the processing circuit 1506 and may also may be operationally coupled to the network communication circuit 1504. The memory/storage device 1508 may include radio link establishment instructions 1526, service management entity operations instructions 1528, and service context establishment instructions 1532.

Optionally, the memory/storage device 1508 may store service contexts 1538 (or credentials).

The SME 1502 may implement one or more of the processes illustrated in FIGS. 1-10. In one example, the SME 1502 may implement one or more of the processes recited in FIG. 16.

Figure 16:
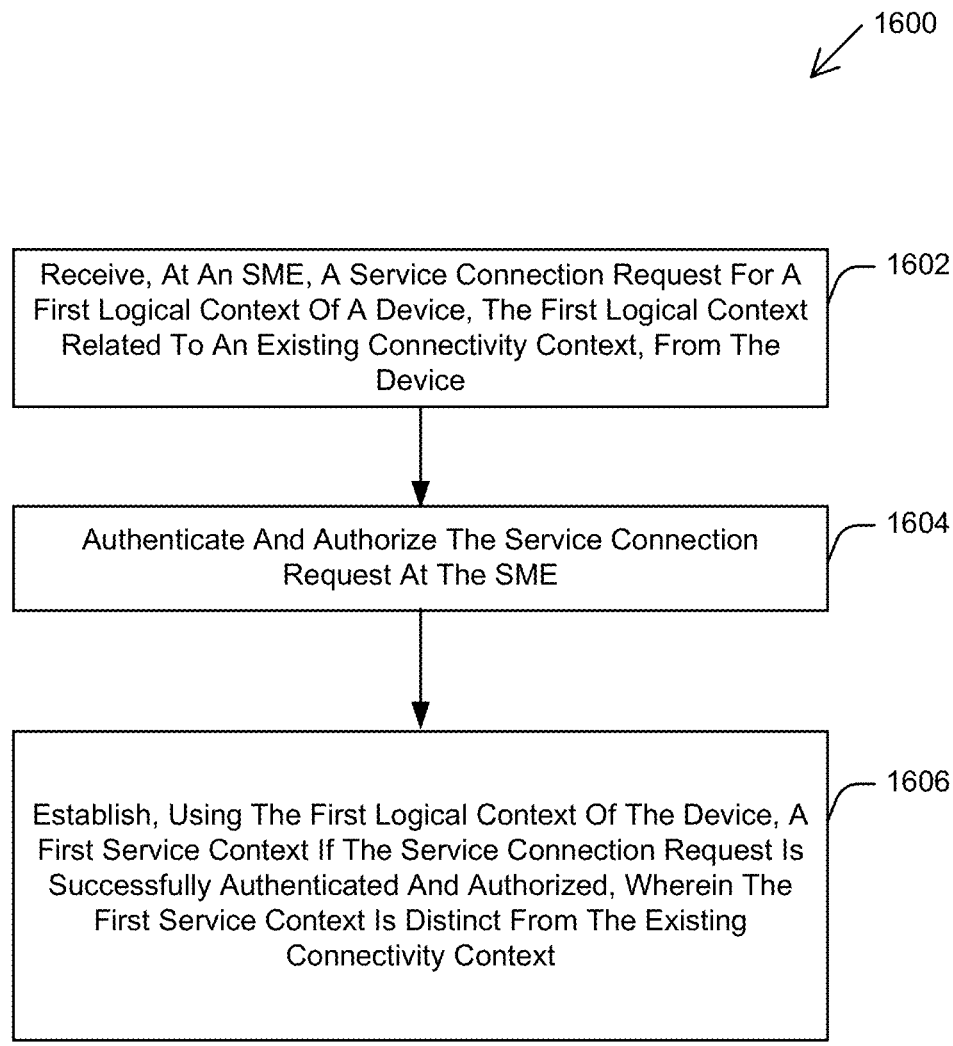
FIG. 16 illustrates an exemplary method, operational at a service management entity in accordance with aspects described herein.

FIG. 16 illustrates an exemplary method, operational at a service management entity (e.g., an SME, a dedicated MME) in accordance with aspects described herein. The method may include receiving, at the SME, a service connection request for a first logical context of a device, the first logical context related to an existing connectivity context, from the device. The connectivity context may be shared by one or more service contexts. The method may include authenticating and authorizing the service connection request at the SME 1604. The method may further include establishing, using the first logical context of the device, a first service context if the service connection request is successfully authenticated and authorized, wherein the first service context is distinct from the connectivity context 1606.

In an aspect, the first service context and the connectivity context can be established over a single radio link with the device.

In an aspect, the connectivity context can be based on a set of credentials associated with a connectivity logical context of the device, the first logical context can be based on a set of credentials associated with a first logical context of the device, and the connectivity logical context can be maintained separately from the first logical context.

In an aspect, the SME is distinct from the connectivity serving node. In another aspect, the SME can be located at a service provider node.

In an aspect, the service connection request may include one or more of a network identifier, a service identifier, and a device type.

In an implementation, a service connection request may be received at the SME from a device and associated with a first service context via a connectivity serving node (e.g., an HMME). The service connection request may be authenticated and authorized at the SME. A service connection may be established to/from the device, wherein the first service context is distinct from any connectivity context for the device. In an aspect, the service connection may be authorized only upon successful authentication and authorization of the service connection request. The service connection request may include one or more of a network identifier, a service identifier, and a device type.

Authenticating and authorizing the service connection request at the SME may include authenticating and authorizing the service connection based on, for example, the first service context. Authorizing the service connection may include authorizing based on, for example, one or more of a network identifier, a service identifier, and a device type.

One or more of the components, processes, aspects, and/or functions illustrated in the figures may be rearranged and/or combined into a single component, process, aspect, and/or function or embodied in several components, processes, aspects, and/or functions. Additional elements, components, processes, aspects, and/or functions may also be added without departing from novel aspects disclosed herein. The apparatus, devices, and/or components illustrated in the figures may be configured to perform one or more of the methods, aspects, or processes described in the figures.

It is noted that the examples may be described as a process depicted as a flowchart, a flow diagram, a structure diagram, or a block diagram. Although a flowchart or flow diagram may describe the process as a sequential process, many of the processes can be performed in parallel or concurrently. In addition, the order of the processes may be re-arranged. A process may be terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other non-transient machine-readable storage mediums, processor-readable mediums, and/or computer-readable mediums for storing information. The terms "machine-readable storage medium", "computer-readable storage medium", and/or "processor-readable storage medium" may include, but are not limited to non-transitory storage mediums such as portable or fixed storage devices, optical storage devices, and various other mediums capable of storing, containing or carrying instruction(s) and/or data. Thus, the various methods described herein may be fully or partially implemented by instructions and/or data that may be stored in a "non-transitory machine-readable storage medium", "non-transitory computer-readable storage medium", and/or "non-transitory processor-readable storage medium" and executed by one or more processing circuits, machines, and/or devices. In general, an instruction stored on a non-transitory machine-readable storage medium, when executed by a processing circuit, causes the processing circuit to perform the instruction.

Furthermore, examples may be implemented by hardware, software, firmware, middleware, microcode, or any combination thereof. When implemented in software, firmware, middleware, or microcode, the program code or code segments to perform the tasks may be stored in a machine-readable medium such as a storage medium or other storage(s). A processor may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the general purpose processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods, algorithms, and/or processes described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithms described in connection with the examples disclosed herein may be implemented as electronic hardware, computer software, or combinations of both. To illustrate this interchangeability of hardware and software, various illustrative components, blocks, modules, circuits, and processes have been described above generally in terms of their functionality. Whether such functionality is implemented as hardware or software depends upon the particular application and design constraints imposed on the overall system.

The various aspects of the examples described herein can be implemented in different systems without departing from the scope of the disclosure. It should be noted that the foregoing examples are merely examples and are not to be construed as limiting. The description of the examples is intended to be illustrative, and not to limit the scope of the claims. As such, the present teachings can be readily applied to other types of apparatuses and many alternatives, modifications, and variations will be apparent to those skilled in the art.

What is claimed is:

1. A method operational at a device comprising:
   initiating a radio link between the device and a network node;
   establishing a connectivity context with a connectivity serving node; and
   establishing a plurality of service contexts with a service management entity,
   wherein the connectivity context and the plurality of service contexts are all established over the radio link.

2. The method of claim 1, wherein a connectivity logical context of the device is used to establish the connectivity context with the connectivity serving node.

3. The method of claim 2, wherein the connectivity context is based on a first set of credentials associated with the connectivity logical context of the device.

4. The method of claim 1, wherein a plurality of logical contexts of the device are used to establish the plurality of service contexts, respectively, with the service management entity.

5. The method of claim 4, wherein each of the plurality of service contexts is based a corresponding set of credentials associated with a corresponding one of the plurality of logical contexts of the device.

6. The method of claim 1, wherein the connectivity context is shared by the plurality of service contexts.

7. The method of claim 1, wherein the connectivity context includes mobility management and signaling security for the device.

8. The method of claim 1, wherein the plurality of service contexts each switch between at least a connected mode and a disconnected mode, and each of the plurality of service contexts is maintained in the device regardless of whether a given service context of the plurality of service contexts switches between the connected mode and the disconnected mode.

9. The method of claim 1, wherein when there is no connection between the device and the network node with respect to at least one of the plurality of service contexts, the at least one of the plurality of service contexts does not have to be reestablished when a connection is reestablished between the device and the network node with respect to the at least one of the plurality of service contexts.

10. The method of claim 9, wherein the connection is reestablished between the device and the network node when the at least one of the plurality of service contexts switches from a disconnected mode to a connected mode.

11. A device, comprising:
a network communication circuit for communicating over a wireless network; and
a processing circuit coupled to the network communication circuit, the processing circuit configured to:
initiate a radio link between the device and a network node;
establish a connectivity context with a connectivity serving node; and
establish a plurality of service contexts with a service management entity,
wherein the connectivity context and the plurality of service contexts are all established over the radio link.

12. The device of claim 11, wherein the processing circuit is further configured to:
establish the connectivity context with the connectivity serving node using a connectivity logical context of the device.

13. The device of claim 12, wherein the connectivity context is based on a first set of credentials associated with the connectivity logical context of the device.

14. The device of claim 11, wherein the processing circuit is further configured to:
establish the plurality of service contexts with the service management entity using a respective plurality of logical contexts of the device.

15. The device of claim 14, wherein each of the plurality of service contexts is based a corresponding set of credentials associated with a corresponding one of the plurality of logical contexts of the device.

16. The device of claim 11, wherein the processing circuit is further configured to:
share the connectivity context with the plurality of service contexts.

17. The device of claim 11, wherein the connectivity context includes mobility management and signaling security for the device.

18. The device of claim 11, wherein the processing circuit is further configured to:
maintain each of the plurality of service contexts regardless of whether a given service context of the plurality of service contexts switches between a connected mode and a disconnected mode.

19. The device of claim 11, wherein when there is no connection between the device and the network node with respect to at least one of the plurality of service contexts, the at least one of the plurality of service contexts does not have to be reestablished when a connection is reestablished between the device and the network node with respect to the at least one of the plurality of service contexts.

20. The device of claim 19, wherein the connection is reestablished between the device and the network node when the at least one of the plurality of service contexts switches from a disconnected mode to a connected mode.

* * * * *